United States Patent
Javerschek et al.

(10) Patent No.: US 12,516,860 B2
(45) Date of Patent: Jan. 6, 2026

(54) REFRIGERANT COMPRESSOR GROUP

(71) Applicant: BITZER Kuehlmaschinenbau GmbH, Sindelfingen (DE)

(72) Inventors: Oliver Javerschek, Tuebingen (DE); Jens Mannewitz, Schkeuditz (DE); Tobias Fuhrer, Rottenburg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 442 days.

(21) Appl. No.: 17/858,499

(22) Filed: Jul. 6, 2022

(65) Prior Publication Data
US 2023/0007826 A1 Jan. 12, 2023

(30) Foreign Application Priority Data
Jul. 8, 2021 (DE) .......................... 102021117724.3

(51) Int. Cl.
F25B 49/02 (2006.01)
F25B 1/10 (2006.01)
F25B 31/02 (2006.01)

(52) U.S. Cl.
CPC .............. *F25B 49/022* (2013.01); *F25B 1/10* (2013.01); *F25B 31/023* (2013.01); *F25B 49/02* (2013.01);
(Continued)

(58) Field of Classification Search
CPC .......... F25B 1/10; F25B 31/023; F25B 49/02; F25B 49/022; F25B 49/025;
(Continued)

(56) References Cited

U.S. PATENT DOCUMENTS 9,945,597 B2 4/2018 Sandkoetter et al.
2006/0218959 A1 10/2006 Sandkoetter
(Continued)

FOREIGN PATENT DOCUMENTS

CN 110307144 B 5/2021
DE 602005005193 T2 4/2009
(Continued)

*Primary Examiner* — Jonathan Bradford
(74) *Attorney, Agent, or Firm* — Reinhart Boerner Van Deuren P.C.

(57) ABSTRACT

A refrigerant compressor group for a refrigeration system that includes least two piston compressors operating in parallel between a common low-pressure connector and a common high-pressure connector. To adjust it to different requirements, in a refrigerant compressor group, a variable overall mass flow throughput in the refrigerant compressor group is adjustable. For at least one of the piston compressors, its mass flow throughput is adjustable by speed selection using a frequency converter for the electric motor. For at least one of the piston compressors, its mass flow throughput is adjustable by cylinder selection. An operating condition controller for the refrigerant compressor group is provided which, on the basis of a performance request signal of the refrigeration system that is transmitted to the operating condition controller, controls the overall mass flow throughput by open or closed-loop control by predetermining the cylinder selection and the speed selection.

32 Claims, 19 Drawing Sheets

(52) U.S. Cl.
    CPC . *F25B 2400/075* (2013.01); *F25B 2400/0751* (2013.01); *F25B 2600/025* (2013.01)

(58) Field of Classification Search
    CPC ........ F25B 2400/075; F25B 2400/0751; F25B 2600/025
    See application file for complete search history.

(56) References Cited

U.S. PATENT DOCUMENTS

| | | | | |
|---|---|---|---|---|
| 2013/0139535 | A1* | 6/2013 | Nares | F04B 39/10 137/565.11 |
| 2017/0130713 | A1 | 5/2017 | Schaich | |
| 2018/0156513 | A1* | 6/2018 | Javerschek | F25B 1/10 |

FOREIGN PATENT DOCUMENTS

| | | |
|---|---|---|
| DE | 102008045103 A1 | 3/2010 |
| DE | 102010033321 A1 | 2/2012 |
| DE | 102014004619 A1 | 10/2015 |
| DE | 102010026648 B4 | 12/2015 |
| EP | 1710435 A1 | 10/2006 |
| EP | 1756483 B1 | 3/2008 |
| EP | 3196465 B1 | 2/2019 |
| EP | 2456980 B1 | 6/2019 |
| IT | 201600114834 A1 | 5/2018 |
| WO | WO 2017/129224 A1 | 8/2017 |
| WO | WO 2018/065071 A1 | 4/2018 |
| WO | WO 2021/124087 A1 | 6/2021 |

\* cited by examiner

REFRIGERANT COMPRESSOR GROUP

The present disclosure claims the benefit of and relates to the subject matter disclosed in German application number 10 2021 117 724.3 of 8 Jul. 2021, which is incorporated herein by reference in its entirety and for all purposes.

BACKGROUND OF THE INVENTION

The invention relates to a refrigerant compressor group for a refrigeration system, comprising at least two piston compressors that operate in parallel between a common low-pressure connector and a common high-pressure connector, are operable individually and each have an electric motor and cylinder units that are driven by this.

In accordance with an embodiment of the invention, provision is made for a refrigerant compressor group of this kind to be operated to different requirements.

SUMMARY OF THE INVENTION

In accordance with an embodiment of the invention, provision is made in the case of a refrigerant compressor group of the type mentioned above that, in the refrigerant compressor group, an overall mass flow throughput in the refrigerant compressor group that is variable within the range from a minimum mass flow throughput to a maximum mass flow throughput is adjustable in that, in the case of at least one of the piston compressors, its mass flow throughput is adjustable by speed selection with the aid of a frequency converter for the electric motor, and in that, in the case of at least one of the piston compressors, its mass flow throughput is adjustable by cylinder selection, and in that an operating condition controller for the refrigerant compressor group is provided which, on the basis of a performance request signal of the refrigeration system that is transmitted to the operating condition controller, controls the overall mass flow throughput by open or closed-loop control by predetermining the cylinder selection and the speed selection.

The advantage of the solution according to the invention can be seen in the fact that, as a result of using at least two piston compressors in the refrigerant compressor group, speed selection and cylinder selection in these piston compressors enable a broad variability in respect of providing a requested overall mass flow throughput, at the same time as a high maximum mass flow throughput as a result of using at least two piston compressors.

Variability of the overall mass flow throughput can be optimised if, for the purpose of achieving at least one overall mass flow throughput in the refrigerant compressor group, in at least one piston compressor the operating condition controller predetermines at least one cylinder selection that is constant over time, that is to say is not time-modulated.

The term "cylinder selection that is not time-modulated" should be understood to mean that, in the respective piston compressor, over the period for which a particular overall mass flow throughput in the refrigerant compressor group is to be achieved, a particular number of cylinders of the respective piston compressor are activated and the others are deactivated.

This extends from activation of all the cylinders to deactivation of all the cylinders, something which is also achievable by switching off the respective piston compressor.

In addition or as an alternative, the variability may be further improved if, for the purpose of achieving the respective overall mass flow throughput in the refrigerant compressor group, the operating condition controller predetermines at least one time-modulated cylinder selection—that is to say cylinder selection that varies over time, in particular by pulse-width modulation or modulation in accordance with WO 2017/129224 A1.

The term "time-modulated cylinder selection" should be understood to mean that, in the respective piston compressor, over the period for which a particular overall mass flow throughput in the refrigerant compressor group is to be achieved, a particular number of cylinders of the respective piston compressor are activated and deactivated in a manner varying over time, in order to reduce the mass flow compressed by these relative to the mass flow when they are uninterruptedly activated.

This may be a time-variable activation and deactivation of all the cylinders of the respective piston compressor, or of only some of these cylinders.

A time-modulated cylinder selection of this kind provides the possibility, in the case of this piston compressor, of varying and reducing its mass flow throughput to a very pronounced extent and hence also of reducing the overall mass flow throughput in the refrigerant compressor group to the lowest possible values, in particular if the piston compressor that is not time-modulated is switched off.

Moreover, it is preferably provided, for the purpose of achieving the respective overall mass flow throughput in the refrigerant compressor group, for the operating condition controller to predetermine a speed selection.

In principle, it is possible for the option of speed selection be provided, and thus also to be predetermined by the operating condition controller, in each of the piston compressors of the refrigerant compressor group.

However, a particularly favourable solution provides for a speed selection to be predeterminable only in the case of one piston compressor of the refrigerant compressor group.

A simple solution provides, for the purpose of achieving the respective overall mass flow throughput, for the operating condition controller to operate a first one of the piston compressors with speed selection and a second one of the piston compressors with cylinder selection.

In this context, the operating condition controller may in principle operate the second piston compressor only with speed selection that is constant over time.

It is even more advantageous, in particular in order to achieve the greatest possible variability in respect of a low overall mass flow throughput, if, for the purpose of achieving the respective overall mass flow throughput, the operating condition controller operates the second piston compressor with cylinder selection that is time-modulated and/or not time-modulated.

In this case, in particular selected cylinders are operated with time modulation and the other cylinders are operated with no time modulation—that is to say they are switched on or switched off.

In particular in combination with the first piston compressor, which is operated with speed selection, this arrangement gives greater variability in order to be able to optimise operation with the respective overall mass flow throughput.

Another advantageous solution provides, for the purpose of achieving the respective overall mass flow throughput, for the operating condition controller to operate a first one of the piston compressors with speed selection and cylinder selection, and a second one of the piston compressors with cylinder selection.

In principle, it would be possible in this case to operate both piston compressors with cylinder selection that is not time-modulated and/or cylinder selection that is time-modulated.

However, in order to structure operation as simply as possible, an advantageous solution provides, for the purpose of achieving the respective overall mass flow throughput, for the operating condition controller to operate the first piston compressor and the second piston compressor with cylinder selection that is not time-modulated, and also to operate one of the piston compressors with cylinder selection that is time-modulated.

In order in particular to enable flexible operation with a low overall mass flow throughput, it is provided for operation of at least one of the piston compressors with speed selection to comprise both operation at a speed of zero and also operation in a speed range that is suitable for the required mass flow throughput—that is to say that the piston compressor to be operated with speed selection can also be switched off.

Moreover, in the context of variability that is optimised to the greatest possible extent, it is advantageous if operation of at least one of the piston compressors by cylinder selection comprises operation with all the cylinder units, or some of these cylinder units, or operation with the cylinder units switched off or the electric motor switched off.

The most diverse possibilities are conceivable as regards operation of the refrigerant compressor group with the aid of the operating condition controller.

Thus, an advantageous solution provides, with an overall mass flow throughput close to the minimum mass flow throughput, for the operating condition controller to operate only one of the piston compressors.

For example, this is achieved in that, with the lowest possible overall mass flow throughput, the operating condition controller operates only the refrigerant compressor that is operable with time-modulated cylinder selection.

In addition or as an alternative, in this case it is preferably provided, with an overall mass flow throughput close to the lowest possible overall mass flow throughput, in particular with the overall mass flow throughput next to the lowest possible overall mass flow throughput, for the operating condition controller to operate only the refrigerant compressor that is operable with speed selection.

Another advantageous solution provides, with the lowest overall mass flow throughput, for the operating condition controller to operate only the piston compressor with speed selection and cylinder selection, in which case the cylinder selection may be for example cylinder selection that is not time-modulated or for example may in addition also be combined with cylinder selection that is time-modulated.

Moreover, the operating condition controller also opens up the possibility, with the respective overall mass flow throughput, of optimising the speed selection and the cylinder selection in respect of the highest quality grade or COP value and/or the lowest electrical power consumption.

A further favourable solution provides, where there are a plurality of possible operating modes as a result of speed selection and cylinder selection, for the purpose of achieving the respective overall mass flow throughput, for the operating condition controller to determine the quality grade or COP value or electrical power consumption for the possible operating modes and to select the operating mode with the highest quality grade or COP value or the lowest electrical power consumption.

Here, the quality grade or electrical power consumption may be determined in the most diverse ways.

One possibility provides for the operating condition controller to have stored data that is required for determining the quality grade or COP value or electrical power consumption for the respective speed selection and/or cylinder selection.

This data may be determined for example in the context of a calibrating operation for the refrigerant group.

Another possibility, for the purpose of determining the quality grade or COP value or electrical power consumption for the respective speed selection and/or cylinder selection, consists in the operating condition controller determining and storing the data in the context of first-time operation and/or in the context of ongoing operation of the refrigerant compressor group.

Another advantageous possibility provides, for the purpose of determining the quality grade or COP value or electrical power consumption for the respective speed selection or cylinder selection, for the operating condition controller to determine these values during respectively ongoing operation of the refrigerant compressor group.

As regards the manner in which the optimum conditions are determined, an advantageous solution provides for the quality grade or COP value or electrical power consumption to be determined by the operating condition controller by detecting the low pressure and/or high pressure of the refrigerant compressor group.

A further advantageous solution provides, for the purpose of determining the quality grade or COP value or electrical power consumption, for the operating condition controller to make use of the refrigerant, the overall mass flow throughput, the electrical power consumption and/or the speed of the electric motors.

A further solution provides, for the purpose of optimising the quality grade or COP value or electrical power consumption of the possible operating modes comprising speed selection and cylinder selection, for the operating condition controller to associate all the overall mass flow throughputs that are achievable by the refrigerant compressor group with different overall mass flow throughput ranges and to associate certain operating modes comprising speed selection and cylinder selection with each overall mass flow throughput range.

In the context of explaining the solution according to the invention thus far, more detailed statements have not been made as to how activation and deactivation of each cylinder bank is to be performed.

Thus, an advantageous solution provides for activation and deactivation of each cylinder bank to be performed with the aid of a mechanical performance control unit that is controlled by the operating condition controller.

This means that in particular the operating condition controller controls the mechanical performance control unit each of the cylinder banks that is provided with a mechanical performance control unit of this kind.

In this context, the mechanical performance control unit may in principle be arranged at any location in the refrigerant compressor.

It is particularly favourable if the mechanical performance control unit is associated with a cylinder head of the respective cylinder bank.

Moreover, it is advantageously provided for the mechanical performance control unit to control an inlet stream into the inlet chamber of the cylinder head for the purpose of activating or deactivating the respective cylinder bank.

This means that in particular the performance control unit interrupts the inlet stream into the inlet chamber and hence deactivates the respective cylinder bank, or vice versa.

Another advantageous solution provides for the performance control unit to connect the outlet chamber to the inlet chamber in the cylinder head for the purpose of activating or deactivating the respective cylinder bank.

This means that in this case in particular the performance control unit short-circuits the outlet chamber and the inlet chamber such that it is possible to drive the cylinder bank without fluctuations in torque—a solution which is particularly suitable where $CO_2$ is the refrigerant.

It is provided for example for the operating condition controller to be able to be a controller that is separate from the frequency converter.

This means that, for example if the frequency converter is integrated into the refrigerant compressor, the operating condition controller is arranged separately, for example on the refrigerant compressor or independently thereof.

As an alternative, however, it is also possible for the operating condition controller to be arranged in a housing that receives the frequency converter and, in the simplest case, is arranged on or in the compressor housing.

An advantageous embodiment of the refrigerant compressor group provides for the cylinder banks of the piston compressors to work in a parallel operation.

In that case, a favourable performance yield is achievable in particular if the respective piston compressor has at least two cylinder units per cylinder bank.

The number of operating modes can be maximised if the piston compressor has more than two cylinder banks.

Moreover, the invention relates to a refrigeration system, comprising a refrigerant compressor group, a heat exchanger on the high-pressure side, an expansion member, and a heat exchanger on the low-pressure side.

According to the invention, for the purpose of optimising operation of a refrigeration system of this kind, it is provided for the refrigerant compressor group to take a form according to one of the preceding embodiments.

Further, it is preferably provided for the refrigeration system to have a system controller that generates the performance request signal for the operating condition controller, for example depending on the material that is to be refrigerated.

In this case, it is also possible for the operating condition controller to be arranged in a housing of the system controller.

Further features and advantages of the invention form the subject matter of the description below and the representation in the drawing of some exemplary embodiments.

Thus, the above description of solutions according to the invention comprises in particular the different combinations of features that are defined by the consecutively numbered embodiments below.

1. A refrigerant compressor group (12) for a refrigeration system (10), comprising at least two piston compressors (30, 32) that operate in parallel between a common low-pressure connector (24) and a common high-pressure connector (14), are operable individually and each have an electric motor (60) and cylinder units (44) that are driven by this, wherein, in the refrigerant compressor group (12), an overall mass flow throughput in the refrigerant compressor group (12) that is variable within the range from a minimum mass flow throughput to a maximum mass flow throughput is adjustable in that, in the case of at least one of the piston compressors (30), its mass flow throughput is adjustable by speed selection (D) with the aid of a frequency converter (62) for the electric motor (60), and in that, in the case of at least one of the piston compressors (30, 32), its mass flow throughput is adjustable by cylinder selection (Z), and in that an operating condition controller (130) for the refrigerant compressor group (12) is provided which, on the basis of a performance request signal (LA) of the refrigeration system (10) that is transmitted to the operating condition controller (130), controls the overall mass flow throughput by open or closed-loop control by predetermining the cylinder selection (Z) and the speed selection (D).

2. A refrigerant compressor group according to embodiment 1, wherein, for the purpose of achieving at least one overall mass flow throughput in the refrigerant compressor group (12), in at least one piston compressor (30, 32) the operating condition controller (130) predetermines at least one cylinder selection (Z) that is constant over time.

3. A refrigerant compressor group according to embodiment 1 or 2, wherein, for the purpose of achieving the respective overall mass flow throughput in the refrigerant compressor group (12), the operating condition controller (130) predetermines at least one time-modulated cylinder selection (Z').

4. A refrigerant compressor group according to one of the preceding embodiments, wherein, for the purpose of achieving the respective overall mass flow throughput in the refrigerant compressor group (12), the operating condition controller (130) predetermines a speed selection (D).

5. A refrigerant compressor group according to one of the preceding embodiments, wherein, for the purpose of achieving the respective overall mass flow throughput, the operating condition controller (130) operates a first one of the piston compressors (30) with speed selection (D) and a second one of the piston compressors (32) with cylinder selection (Z).

6. A refrigerant compressor group according to embodiment 5, wherein, for the purpose of achieving the respective overall mass flow throughput, the operating condition controller (130) operates the second of the piston compressors with cylinder selection (Z, Z') that is time-modulated and/or not time-modulated.

7. A refrigerant compressor group according to one of the preceding embodiments, wherein, for the purpose of achieving the respective overall mass flow throughput, the operating condition controller (130) operates a first one of the piston compressors (30) with speed selection (D) and cylinder selection (Z), and a second one of the piston compressors (32) with cylinder selection (Z).

8. A refrigerant compressor group according to embodiment 7, wherein, for the purpose of achieving the respective overall mass flow throughput, the operating condition controller (130) operates the first piston compressor (30) and the second piston compressor (32) with cylinder selection (Z) that is not time-modulated, and also operates one of the piston compressors (30, 32) with cylinder selection (Z') that is time-modulated.

9. A refrigerant compressor group according to one of the preceding embodiments, wherein operation of at least one of the piston compressors (30, 32) with speed selection (D) comprises both operation at a speed of zero and also operation in a speed range (D) that is suitable for the required mass flow throughput.

10. A refrigerant compressor group according to one of the preceding embodiments, wherein operation of at least one of the piston compressors (30, 32) by cylinder selection (Z) comprises operation with all the cylinder units (44), or some of these cylinder units (44), or operation with the cylinder units (44) switched off or the electric motor switched off.

11. A refrigerant compressor group according to one of the preceding embodiments, wherein, with an overall mass flow throughput close to the minimum mass flow throughput, the operating condition controller (130) operates only one of the piston compressors (30, 32).

12. A refrigerant compressor group according to embodiment 11, wherein, with the lowest possible overall mass flow throughput, the operating condition controller (130) operates only the refrigerant compressor (30, 32) that is operable with time-modulated cylinder selection (Z').

13. A refrigerant compressor group according to embodiment 11 or 12, wherein, with an overall mass flow throughput close to the lowest possible overall mass flow throughput, the operating condition controller (130) operates only the refrigerant compressor (30) that is operable with speed selection (D).

14. A refrigerant compressor group according to embodiment 11, wherein, with the lowest overall mass flow throughput, the operating condition controller (130) operates only the piston compressor (30) with speed selection (D) and cylinder selection (Z).

15. A refrigerant compressor group according to one of the preceding embodiments, wherein, with the respective overall mass flow throughput, the operating condition controller (130) optimises the speed selection (D) and the cylinder selection (Z, Z') in respect of the highest quality grade or the highest COP value or the lowest electrical power consumption of the refrigerant compressor group (12).

16. A refrigerant compressor group according to one of the preceding embodiments, wherein, where there are a plurality of possible operating modes as a result of speed selection (D) and cylinder selection (Z), for the purpose of achieving the respective overall mass flow throughput, the operating condition controller (130) determines the quality grade or COP value or electrical power consumption for the possible operating modes and selects the operating mode with the highest quality grade or COP value or the lowest electrical power consumption.

17. A refrigerant compressor group according to one of the preceding embodiments, wherein the operating condition controller (130) has stored data that is required for determining the quality grade or COP value or electrical power consumption for the respective speed selection (D) and/or cylinder selection (Z).

18. A refrigerant compressor group according to one of embodiments 15 to 17, wherein the quality grade or COP value or electrical power consumption is determined by the operating condition controller (130) by detecting the low pressure (PS) and/or high pressure (PH) of the refrigerant compressor group (12).

19. A refrigerant compressor group according to one of embodiments 15 to 18, wherein, for the purpose of determining the quality grade or COP value or electrical power consumption, the operating condition controller (130) makes use of the refrigerant, the overall mass flow throughput, the electrical power consumption and/or the speed of the electric motors (60).

20. A refrigerant compressor group according to one of the preceding embodiments, wherein, for the purpose of optimising the quality grade or COP value or electrical power consumption of the possible operating modes comprising speed selection (D) and cylinder selection (Z), all the overall mass flow throughputs that are achievable by the refrigerant compressor group (12) are associated with different overall mass flow throughput ranges, and in that certain operating modes are associated with each overall mass flow throughput range.

21. A refrigerant compressor group according to one of the preceding embodiments, wherein activation and deactivation of each cylinder bank (42) is performed with the aid of a mechanical performance control unit (70) that is controlled by the operating condition controller (130).

22. A refrigerant compressor group according to embodiment 21, wherein the mechanical performance control unit (70) is associated with a cylinder head (58) of the cylinder bank (42).

23. A refrigerant compressor group according to embodiment 21 or 22, wherein the mechanical performance control unit (70) controls an inlet stream (74) into the inlet chamber (72) of the cylinder head (58) for the purpose of activating or deactivating the respective cylinder bank (42).

24. A refrigerant compressor group according to one of the preceding embodiments, wherein the performance control unit (70) connects the outlet chamber (164) to the inlet chamber (162) in the cylinder head (58) for the purpose of activating or deactivating the respective cylinder bank (42').

25. A refrigerant compressor group according to one of the preceding embodiments, wherein the operating condition controller (130) is an operating condition controller (130) that is separate from the frequency converter (132).

26. A refrigerant compressor group according to one of the preceding embodiments, wherein the operating condition controller (130) is arranged in a housing (40) that receives the frequency converter (132).

27. A refrigerant compressor group according to one of the preceding embodiments, wherein the cylinder banks (42) of the piston compressors (30, 32) work in a parallel operation.

28. A refrigerant compressor group according to one of the preceding embodiments, wherein the piston compressors (30, 32) have at least two cylinder units (44) per cylinder bank (42).

29. A refrigerant compressor group according to one of the preceding embodiments, wherein the piston compressors (30, 32) have more than two cylinder banks (42).

30. A refrigeration system, comprising a refrigerant compressor group (12), a heat exchanger (18) on the high-pressure side, an expansion member (30), and a heat exchanger (32) on the low-pressure side, wherein the refrigerant compressor group (12) takes a form according to one of the preceding embodiments.

31. A refrigeration system according to embodiment 30, wherein the refrigeration system (10) has a system controller (138) that generates the performance request signal (LA) for the operating condition controller.

32. A refrigeration system according to embodiment 31, wherein the operating condition controller (130) is arranged in a housing of the system controller (138).

DETAILED DESCRIPTION OF THE INVENTION

Figure 1:
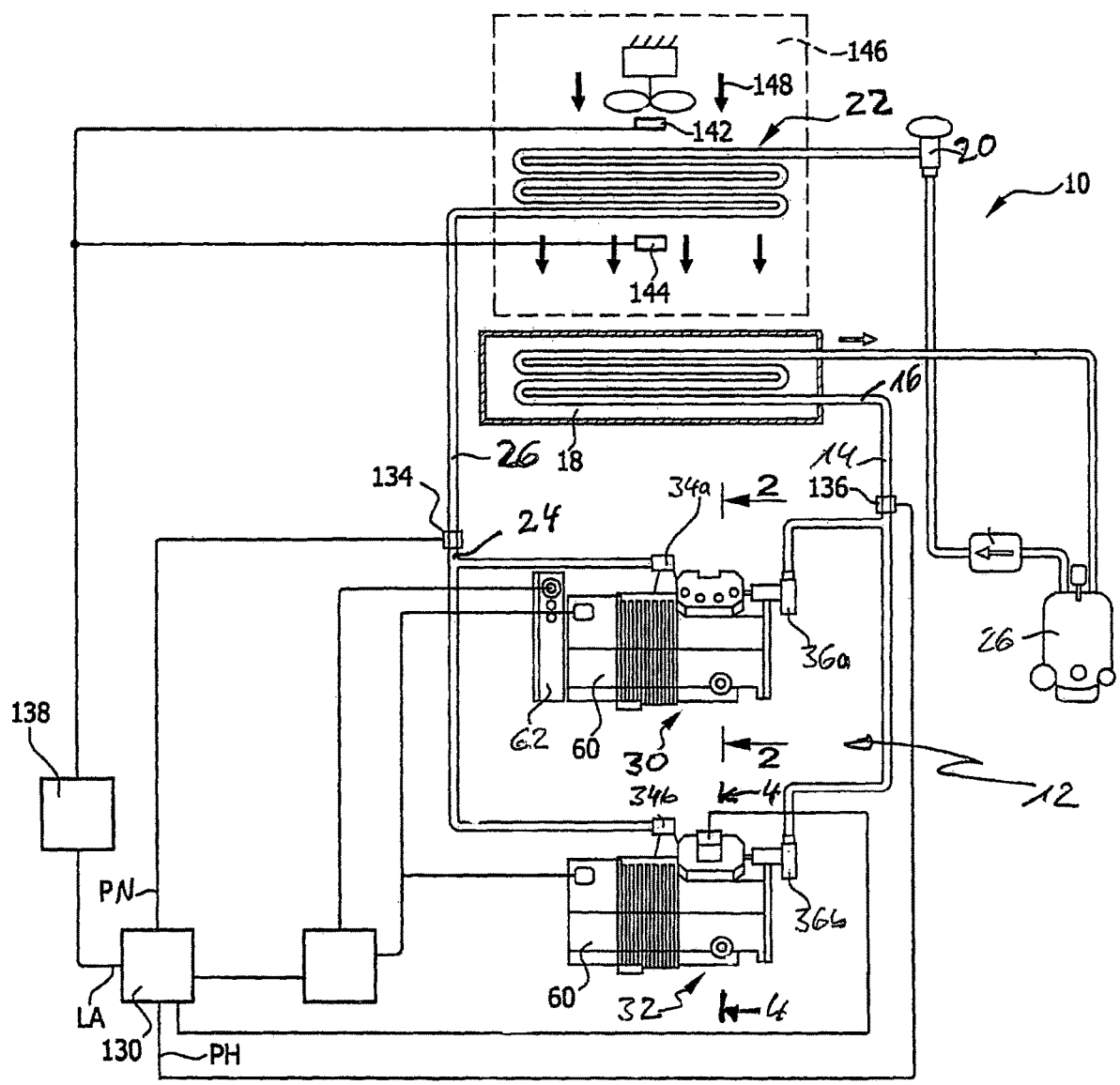
FIG. 1 shows a schematic illustration of a refrigeration system according to the invention, with a refrigerant compressor group according to the invention.

One exemplary embodiment of a refrigeration system according to the invention, which is designated 10 as a whole, comprises a refrigerant compressor group 12, from the high-pressure connector 14 of which a high-pressure line 16 leads to a heat exchanger on the high-pressure side, which is designated 18 as a whole and in which the compressed refrigerant is condensed by the removal of heat to a heat sink, for example recirculated ambient air or other cooling media.

Liquid refrigerant flows from the heat exchanger 18 on the high-pressure side to an expansion member 20 and from this to a heat exchanger 22 on the low-pressure side.

For example, between the heat exchanger 18 and the expansion member 20 there is also a collector 26, connected to the heat exchanger 18 by a line, and the liquid refrigerant is collected in this and then flows from it via a line to the expansion member 20.

After flowing through the low-pressure heat exchanger 32, the evaporated refrigerant flows via a line 26 to a low-pressure connector 24 of the refrigerant compressor group 12.

The refrigerant compressor group 12 comprises at least two piston compressors 30 and 32 that operate in parallel between the low-pressure connector 24 and the high-pressure connector 14 and of which the suction ports 34a and 34b are connected to the low-pressure connector 24 and the pressurised ports 36a, 36b are connected to the high-pressure connector 14.

Figure 2:
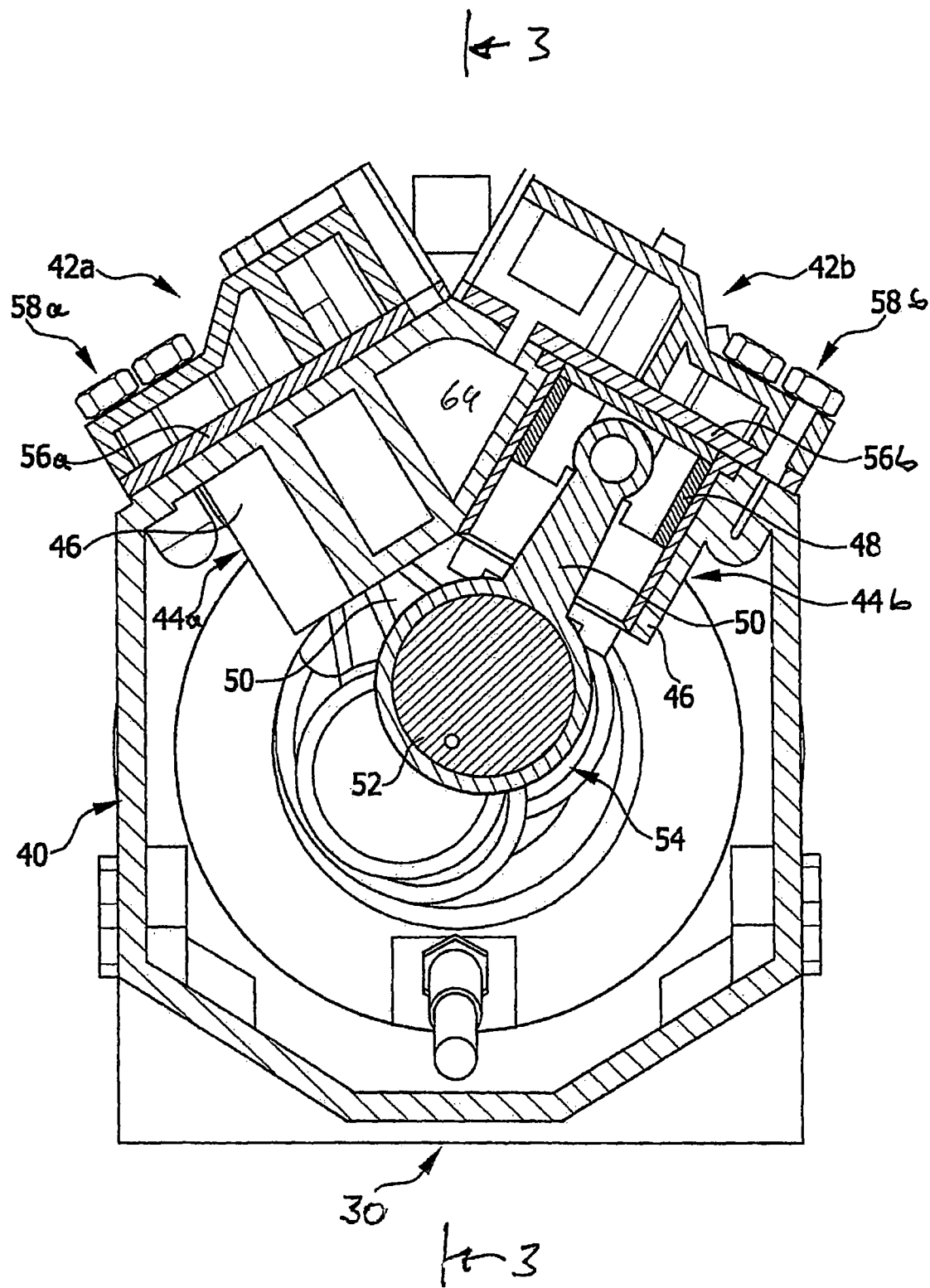
FIG. 2 shows a cross section along the line 2-2 in FIG. 1, through a first piston compressor of the refrigerant compressor group of the refrigeration system according to the invention.
Figure 3:
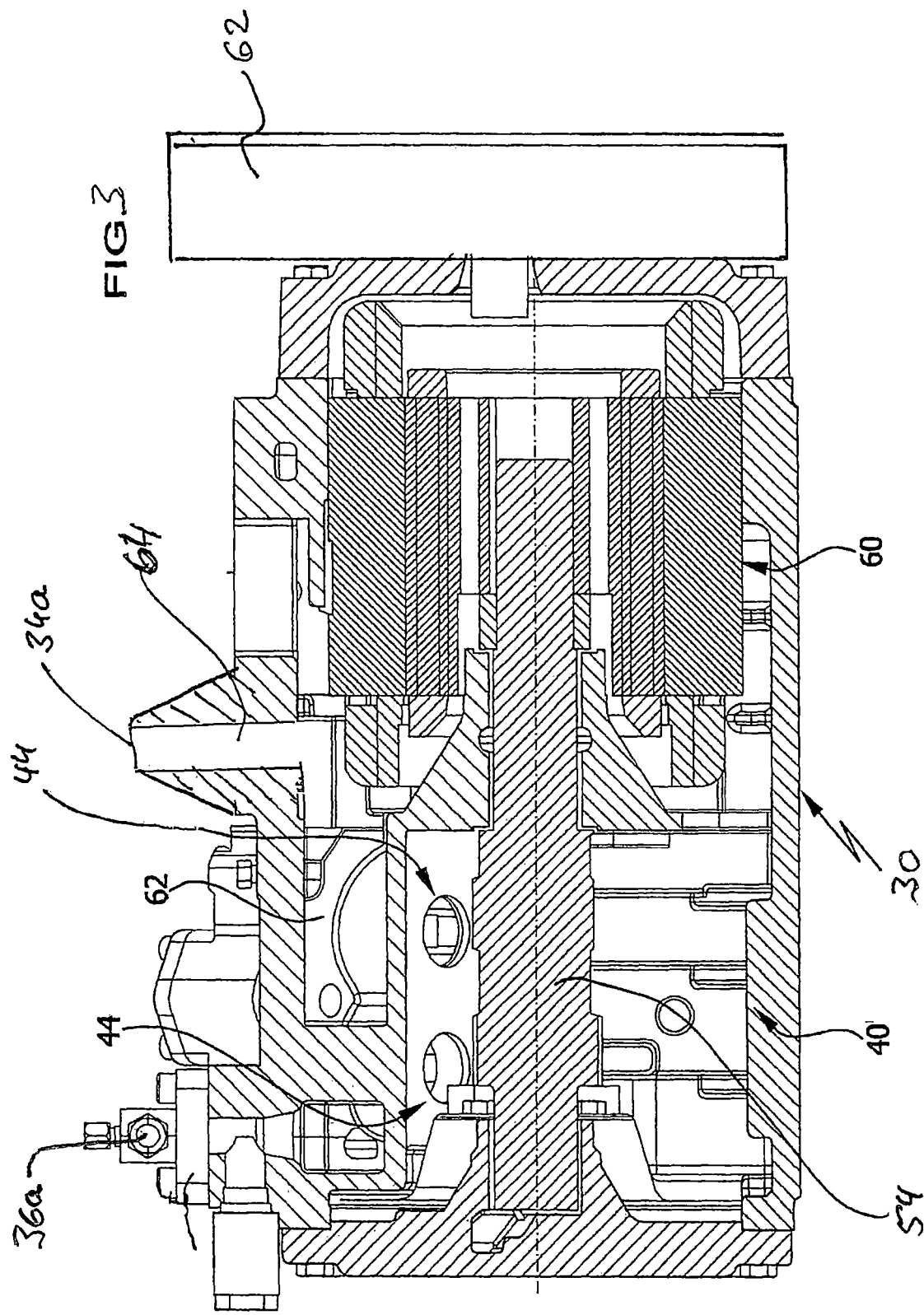
FIG. 3 shows a longitudinal section along the line 3-3 in FIG. 2, through the first reciprocating piston compressor.

As illustrated in FIGS. 2 and 3, the first piston compressor 30 comprises a compressor housing 40 in which there are provided for example two cylinder banks 42a and 42b that are arranged in a V shape in relation to one another and operate in parallel and of which each comprises at least one, in particular two or more cylinder units 44.

Each of these cylinder units 44 is formed from a cylinder housing 46, in which a piston 48 is movable in reciprocating manner in that the piston 48 is drivable by a piston rod 50, which is in turn seated on an eccentric 52 of an eccentric shaft 54 or is driven by a camshaft that is driven for example by an electric motor 60, which may be configured as a synchronous or asynchronous motor.

The cylinder housing 46 of each of the cylinder units 44 is closed off by a valve plate 56 on which there is arranged a cylinder head 58a, 58b for each of the cylinder banks 42a, 42b.

Preferably, in this context, the valve plate 56 covers not only one cylinder housing 46 of a cylinder unit 44 but all the cylinder housings 46 of the respective cylinder bank 42a, 42b, and in the same way the cylinder head 58a, 58b likewise embraces all the cylinder housings 46 of the respective cylinder bank 42a, 42b.

Moreover, arranged on the compressor housing 40 is also a frequency converter 62 that is for operating the electric motor 60 with open or closed-loop speed control and that operates the electric motor 60 at a voltage which varies according to a drive frequency and results in a speed that is substantially proportional to a drive frequency.

Further, the compressor housing 40 also comprises an inlet channel 64, which is in communication with the suction port 34a and is for example integrated into the compressor housing 40, and the pressurised port 36a.

In this way, the first piston compressor 30 is operable in a speed selection mode with a predeterminable speed selection D with the aid of the frequency converter 62, with the result that its mass flow throughput from the suction port 34a to the pressurised port 36a also varies depending on the speed.

The second piston compressor 32 likewise has a compressor housing 40 with cylinder banks 42a and 42b, of which likewise each comprises at least one, in particular two or more cylinder units 44.

Figure 4:
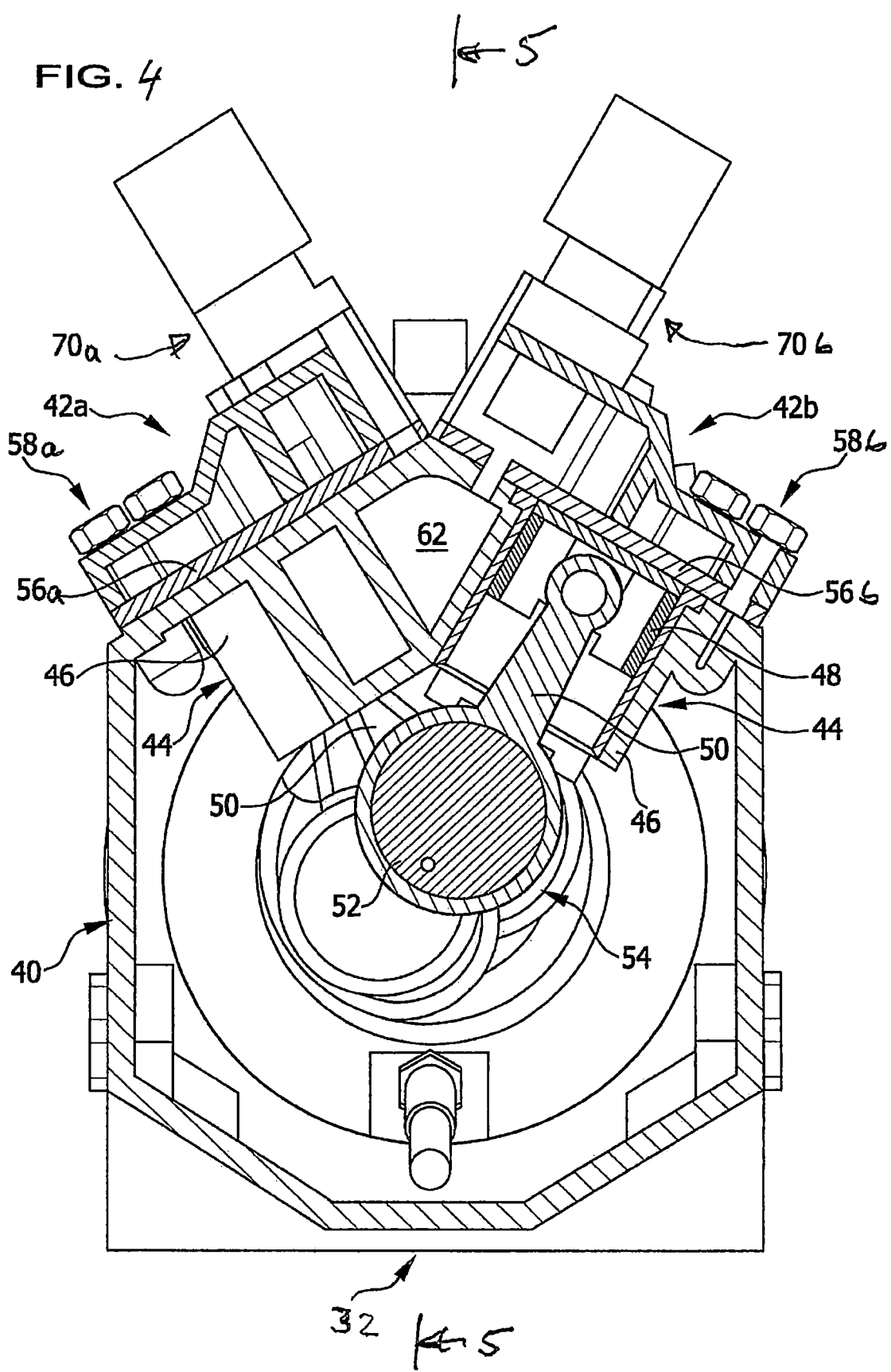
FIG. 4 shows a cross section along the line 4-4 in FIG. 1, through a second piston compressor of the refrigerant compressor group.
Figure 5:
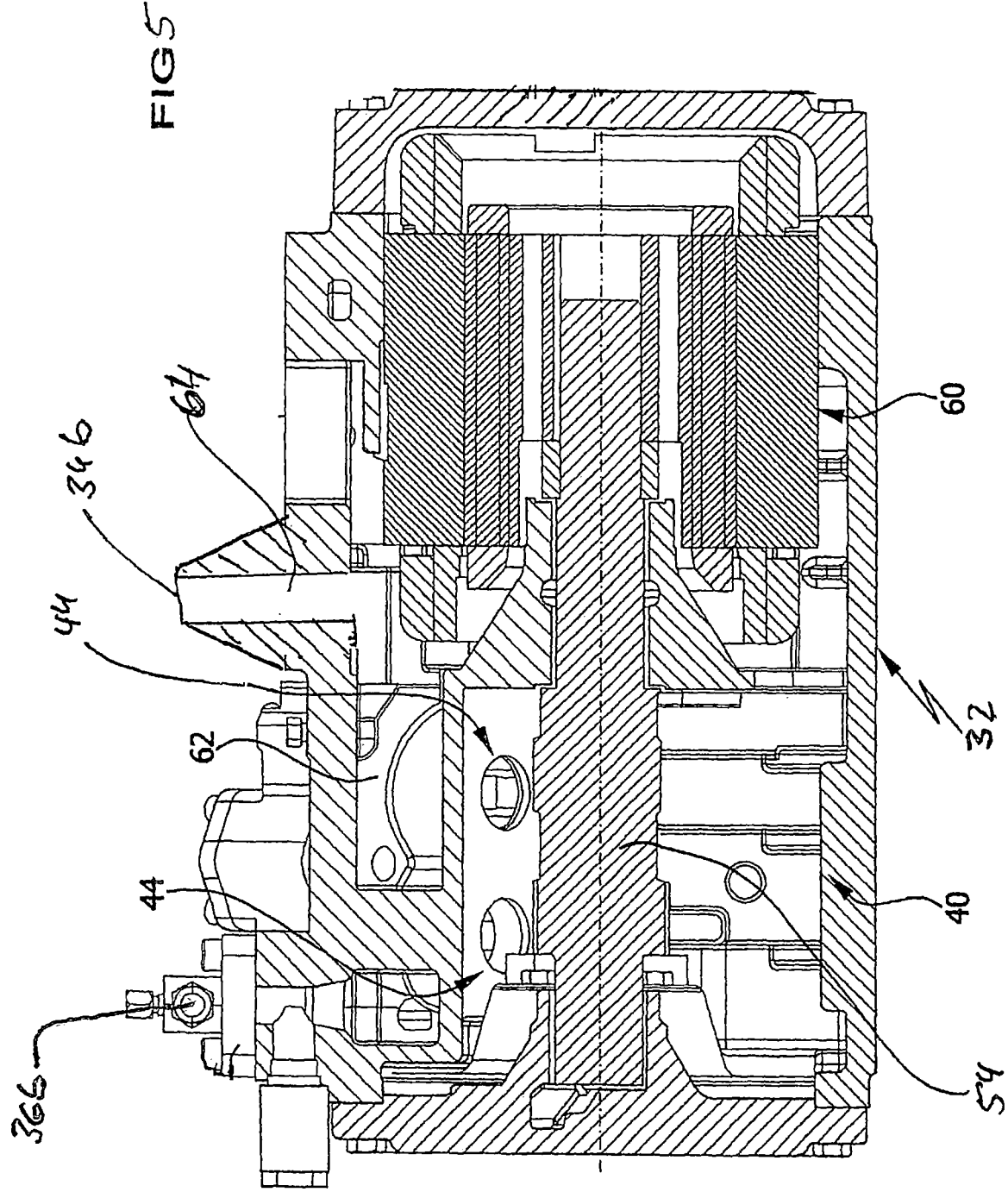
FIG. 5 shows a longitudinal section along the line 5-5 in FIG. 4, through the second piston compressor.

The cylinder units 44 are configured in the same way as in the case of the first piston compressor 30, as illustrated in FIG. 4, and are likewise driven by an electric motor 60, as illustrated in FIGS. 4 and 5.

Further, the cylinder units 44 are likewise closed off, as in the case of the first piston compressor 30, by a valve plate 56 and cylinder heads 58.

However, in the case of the second piston compressor 32, the electric motor 60 is not operable by a frequency converter 62 but is only operable at a constant speed.

Figure 6:
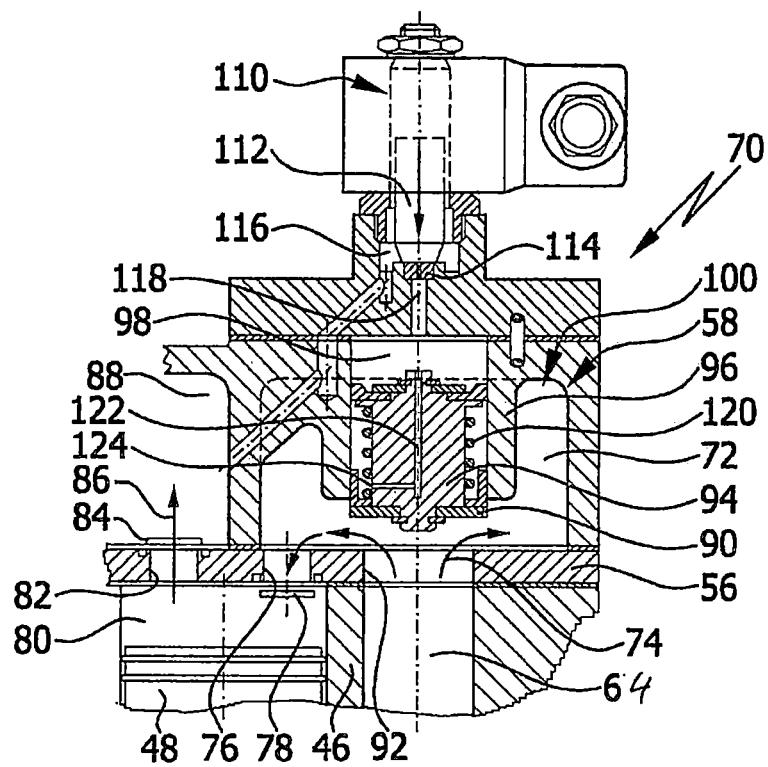
FIG. 6 shows a section through a mechanical performance control unit integrated into a cylinder head, in the open position of a valve body of the mechanical performance control unit.
Figure 7:
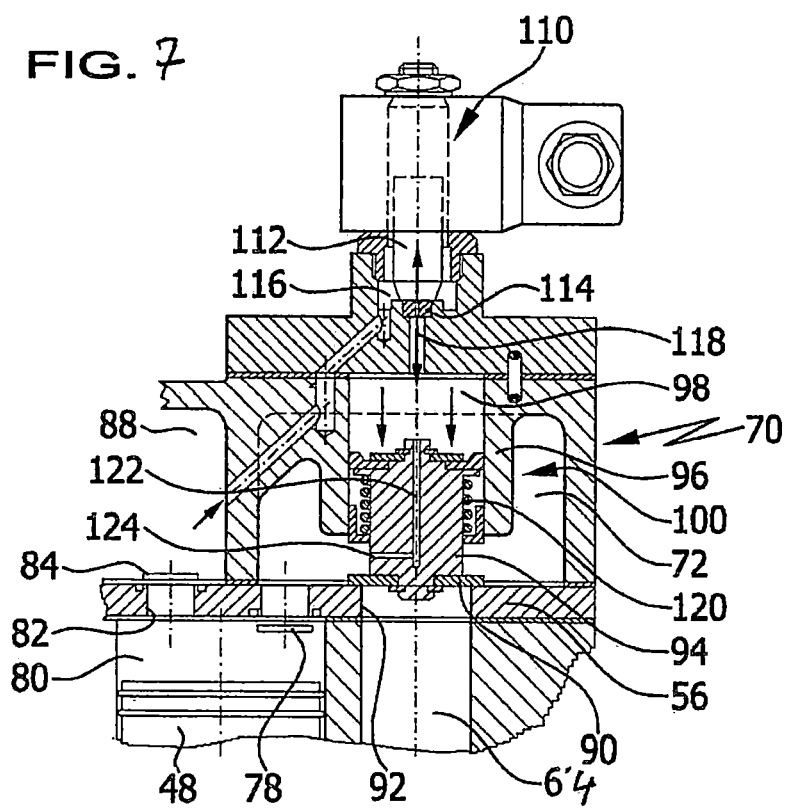
FIG. 7 shows a section similar to FIG. 6, in a closed position of the valve body of the mechanical performance control unit.

As illustrated on a larger scale in FIG. 4, in the case of the piston compressor 32 there is associated with at least one cylinder bank 42, in particular each cylinder bank 42, a mechanical performance control unit that is designated 70 as a whole and that serves to allow an inlet stream 74 of refrigerant to pass from the inlet channel 64, through the valve plate 56 and into the respective cylinder head 58, in particular into an inlet chamber 72 thereof, in order thus to activate the respective cylinder bank 42, or to interrupt an inlet stream 74 of this kind in order thus to deactivate the respective cylinder bank 42, as illustrated in FIGS. 6 and 7.

If the mechanical performance control unit 70 is open, as illustrated in FIG. 6, the inlet stream 74 is able to pass through an inlet opening 76 provided in the valve plate 56 and an inlet valve 78 provided at the valve plate 56 and into a cylinder chamber 80 that is delimited by the respective piston 48 and the respective cylinder housing 46 and the valve plate 56, in order to be compressed in this cylinder chamber 80 by the reciprocating movement of the piston 48, with the result that an outlet stream 86 flows through an outlet opening 82 and an outlet valve 84 and out of the cylinder chamber 80 and enters an outlet chamber 88 of the cylinder head 58.

The mechanical performance control unit 70 is configured for example as a servo valve that is integrated into the respective cylinder head 58 and has a valve body 90 by means of which an inflow opening 92 to the inlet chamber 72, provided in the valve plate 56, is closable.

Further, the valve body 90 is arranged on an operating piston 94 that is guided in an operating cylinder housing 96 such that the operating piston 94 is movable in the direction of the valve plate 56 by a pressure prevailing in an operating cylinder chamber 98 in order to close off the inflow opening 92 therein.

In this arrangement, an operating cylinder unit 100, which is formed by the operating cylinder housing 96, the operating piston 94 and the operating cylinder chamber 98, and which is integrated into the cylinder head 58, is controllable by way of a control valve 110 that comprises an electromagnetically movable control piston 112 which is configured to close off a control valve seat 114, wherein the control piston 112 and the control valve seat 114 are provided for the purpose of interrupting or clearing a connection between a tubular-pressure channel 116 leading to the outlet chamber 88 and a pressure supply channel 118 for the operating cylinder 100, leading to the operating cylinder chamber 98.

If the connection between the high-pressure channel 116 and the pressure supply channel 118 is cleared, the operating cylinder chamber 98 is subject to the high pressure prevailing in the outlet chamber 88, so the operating piston 94 moves in the direction of the valve plate 56 and presses the valve body 90 against it in order to close off the inflow opening 92 in the valve plate 56 (FIG. 7).

During this, the force acting on the operating piston 94 as a result of the high pressure in the operating cylinder chamber 98 is countered by the force of a resilient energy store 120 that is supported on the one hand against the operating cylinder housing 96 and on the other against the operating piston 94 such that the operating piston 94 moves away from the valve plate 56 and thus moves the valve body 90 into a position that clears the inflow opening 92.

In particular, the operating piston 94 is provided with a pressure relief channel 122, which leads from an opening facing the operating cylinder chamber 98 to an outlet opening 124 that is illustrated in FIG. 7 and opens into the inlet chamber 72 when the valve body 90 and the operating piston 94 are in the position in which the inflow opening 92 is closed off. In this case, the pressure relief channel 124 has the effect that, if the connection between the high-pressure channel 116 and the pressure supply channel 118 is interrupted, the pressure in the operating cylinder chamber 98 quickly collapses and thus, under the action of the resilient energy store 120, the operating piston 94 and the valve body 90 move into a position that clears the inflow opening 92, illustrated in FIG. 6.

The respective mechanical performance control unit 70 is controllable by an operating condition controller 130, illustrated in FIG. 1, such that this may close or open the mechanical performance control unit 70 in order to activate or deactivate the respective cylinder bank 42a, 42b and thus to operate the refrigerant compressor 12 with a cylinder selection Z that defines the scope of activation and deactivation of the cylinder banks 42.

Moreover, as a result of the operating condition controller 130, the electric motor 60 of the first piston compressor 30 is also controllable, in particular by control of a frequency converter 62 of the electric motor 60, in order to enable this to be operated at variable speed in accordance with speed selection D and hence to achieve a defined mass flow throughput.

Furthermore, the operating condition controller 130 detects the respective overall mass flow throughput in the refrigerant compressor group 12, for example by measuring the low pressure PN with the aid of a low-pressure sensor 134 that is arranged close to or on the low-pressure connector 24 of the refrigerant compressor group 12, and a high pressure PH with the aid of a high-pressure sensor 136 that is arranged close to or on the high-pressure connector 14.

Further, the electrical power consumed by the electric motor 60 of the first piston compressor 30 can also be detected with the aid of the frequency converter 62.

Moreover, also transmitted to the operating condition controller 130 is a performance request signal LA that is generated by a for example higher-level system controller 138 that detects the refrigeration performance that is requested at the low-pressure heat exchanger 32, for refrigerating an object 146, for example a refrigeration cabinet, for example by temperature sensors 142 and 144 which are associated with the low-pressure heat exchanger 32 and which enable the temperatures of a medium 148 flowing through the low-pressure heat exchanger 32 and the object 146 to be detected, for example upstream and downstream of the low-pressure heat exchanger 32, and to be compared with a requested temperature of the medium 146.

The operating condition controller 130 is able to adapt the refrigeration performance of the refrigeration system 10 to the refrigeration performance required for refrigeration of the object 146, predetermined by the performance request signal LA, on the one hand by adjusting the overall mass flow throughput with the aid of cylinder selection Z of the second piston compressor 32, which in the first exemplary embodiment is operated at constant speed, for example at a drive frequency of 50 Hz corresponding to mains frequency, and on the other with the aid of speed selection D—that is to say by regulating the speed of the electric motor 60 of the first piston compressor 30 with the aid of the frequency converter 62.

Figure 10:
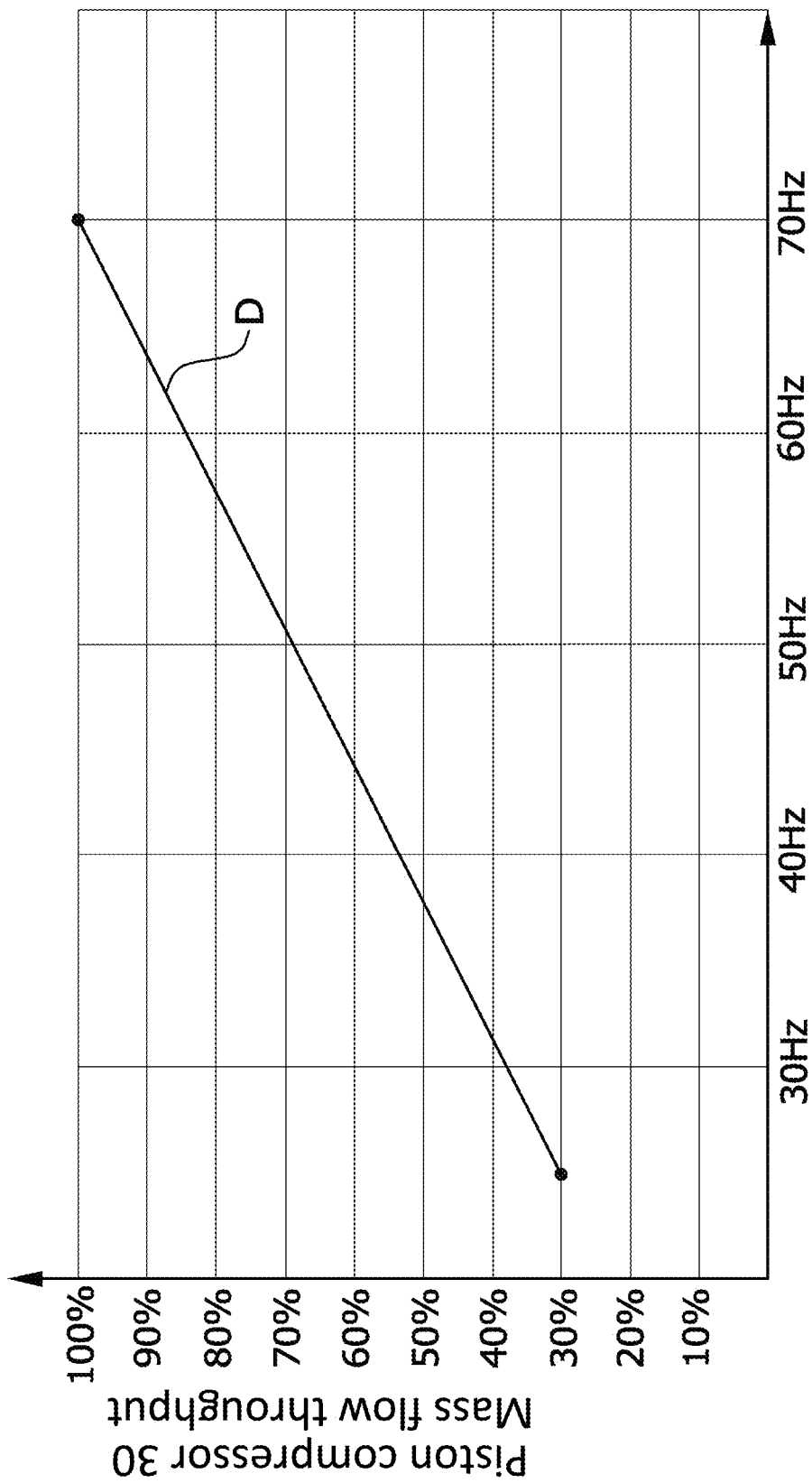
FIG. 10 shows an illustration of the mass flow throughput in the first piston compressor with speed selection.

As illustrated in FIG. 10, the electric motor 60 of the piston compressor 30 is operable within a limited speed range, for example predetermined by drive frequencies of between 25 Hz and 70 Hz generated by the frequency converter 62, with the result that, as illustrated in FIG. 10, the mass flow throughput in the piston compressor 30 is variable by the speed selection D from approximately 30% of the maximum value to the maximum value of 100%.

The mass flow throughput in the second piston compressor 32 is controlled by the cylinder selection Z, Z', which in this case is performed by control of the performance control units 70.

Figure 11:
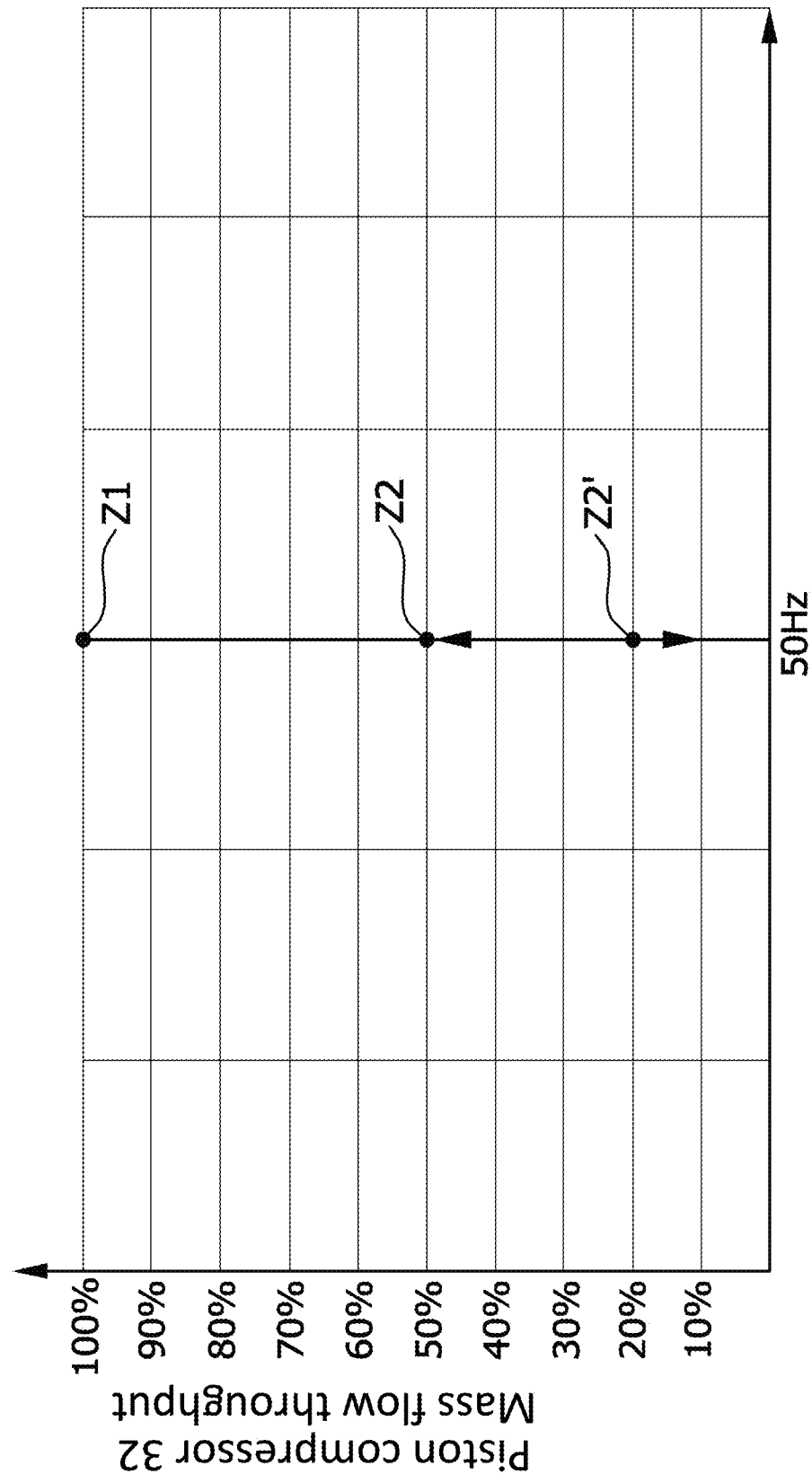
FIG. 11 shows an illustration of the mass flow throughput in the second piston compressor with cylinder selection.

Activation or deactivation of at least one of the cylinder banks 42a, 42b by the cylinder selection Z may be performed in the case of the piston compressor 32 with cylinder selection that is not time-modulated, with no change over the entire period of the respective requested mass flow throughput, with the result that, for example during a particular period, with operation of the piston compressor 32 with cylinder selection Z1—that is to say with both cylinder banks 42a and 42b—the maximum mass flow throughput of 100% in the piston compressor is achievable, whereas with cylinder selection Z2—that is to say with operation using only one of the cylinder banks 42a, 42b—a mass flow throughput of 50% is achievable, as illustrated in FIG. 11.

As an alternative, however, during the period of a requested mass flow throughput it is also possible, with time-modulated cylinder selection Z', to activate or deactivate at least one cylinder bank 42a, 42b or both cylinder banks 42 with time modulation—that is to say for example in clocked manner.

Figure 8:
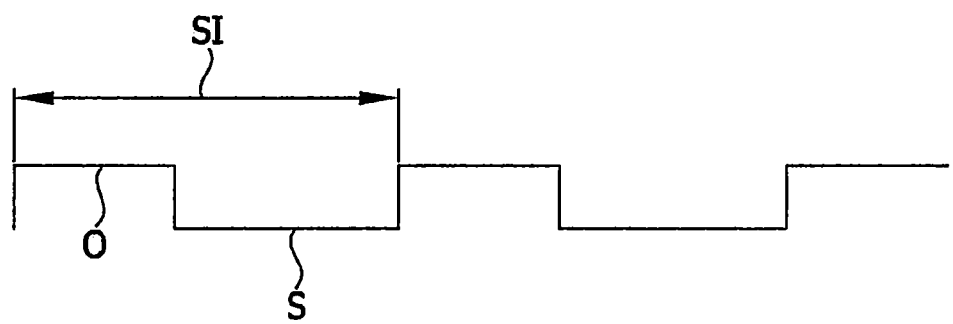
FIG. 8 shows a schematic illustration of a switching interval, comprising an open interval and a closed interval.

For this purpose, the mechanical performance control unit 70 is configured to be controlled for example by the operating condition controller 130 illustrated in FIG. 1 such that the mechanical performance control unit 70 is closed and opened at continuously succeeding switching intervals SI by the operating condition controller 130, as illustrated in FIG. 8, wherein each of the switching intervals SI has an open interval O during which the valve body 90, in its clearing position, allows the inlet stream 74 to pass through the inflow opening 92 and activates the corresponding cylinder bank 42, as illustrated in FIG. 6, and a closed interval S during which the valve body 90, as illustrated in FIG. 7, in its closing position, blocks flow of the inlet stream 74 through the inflow opening 92 and thus deactivates the corresponding cylinder bank 42.

Within the duration of the respective switching interval SI it is possible to variably adjust the period of the open interval O and the closed interval S in relation to one another, with the result that either the open interval O is larger than the closed interval or vice versa.

In the extreme case, the open interval O can last for substantially the entire duration of the switching interval SI, while the closed interval S becomes vanishingly small, or conversely it is also possible for the closed interval S to last for substantially the entire duration of the switching interval SI, with the result that the open interval O becomes vanishingly small.

Because, in the refrigeration system 10 according to the invention, liquid refrigerant is typically constantly evaporating by way of the expansion valve 20, interrupting or pronouncedly varying the compression of refrigerant by the refrigerant compressor group 12 would result in a rise in the temperature T in the low-pressure heat exchanger 22.

Figure 9:
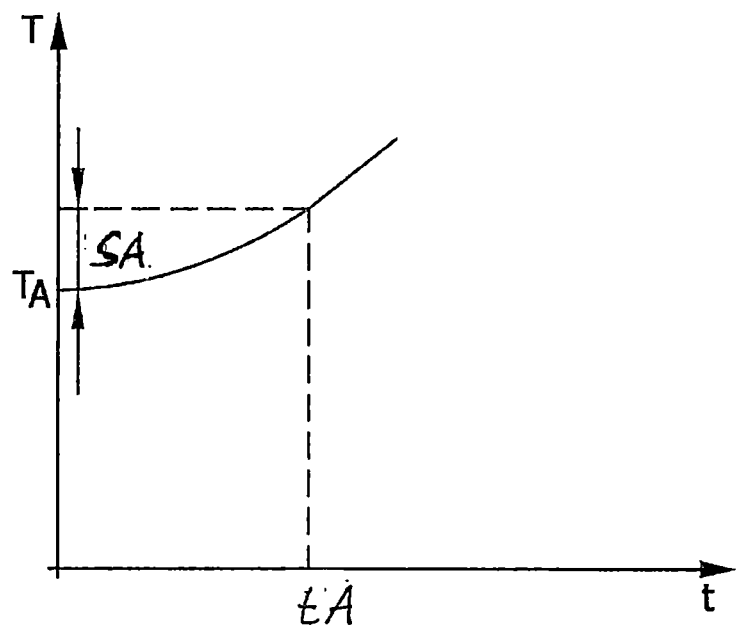
FIG. 9 shows a schematic illustration of a behaviour of the temperature of the heat exchanger that is on the low-pressure side in the refrigeration system when the compression of refrigerant is interrupted.

However, the system has sluggish reactions, so if there is an interruption or pronounced variation in the removal by suction of refrigerant from the low-pressure heat exchanger 22 the temperature T of the low-pressure heat exchanger 32 does not rise immediately but, as illustrated in FIG. 9, takes a time Z to increase by a value SA.

As long as the value SA lies at values 10% smaller than a starting temperature $T_A$ of the low-pressure heat exchanger, these fluctuations are irrelevant to functioning of the refrigeration system according to the invention.

For this reason, the switching interval SI is selected such that it is shorter than the time to that elapses until the temperature T of the low-pressure heat exchanger 32—starting from a temperature $T_A$ of the low-pressure heat exchanger 32—has risen by a value SA of approximately 10%, or preferably approximately 5%, in the event of a sudden interruption to removal by suction of refrigerant from the low-pressure heat exchanger 32 and to the supply of medium under high pressure at the high-pressure connector 14.

This ensures that the open intervals O and the closed intervals S within the respective switching interval SI do not have a substantial effect on functioning of the refrigeration system, and only result in slight fluctuations in the temperature of the low-pressure heat exchanger 32 of the refrigeration system according to the invention.

Usually, the periods of the switching intervals SI are periods shorter than approximately 10 seconds, preferably shorter than approximately 5 seconds.

On the other hand, in order to ensure sufficient open intervals O, the switching intervals are longer than approximately 1 second, preferably longer than 2 seconds.

A preferred operating range provides switching intervals SI of a duration between 2 and 10 seconds.

In order to ensure switching intervals SI as short as this, it is preferably provided for the operating pistons 94, together with the valve body 90 and the resilient energy stores 120, overall to have a resonant frequency that is higher than the frequency corresponding to the maximum switching intervals SI, with the result that the operating pistons 94 are able to achieve the open intervals O and the closed intervals S within the switching intervals SI, substantially without any delay.

Preferably, the resonant frequencies of the systems comprising operating piston 94, valve body 90 and resilient energy store 120 are higher than the frequencies corresponding to the switching intervals SI by a factor of at least 5 or preferably at least 10.

As an alternative, however, it is also possible, with the aid of the operating condition controller, to activate or deactivate one or both cylinder banks 42a according to WO 2017/129224 A1.

As a result of time-modulated cylinder selection Z', the piston compressor 32 may be operated, for example with cylinder selection Z2', with only one modulated cylinder bank 42a, while the other cylinder bank 42b is switched off, and as a result of this the mass flow throughput may for example be variably adjusted to from 50% to 10% of the maximum mass flow throughput in the piston compressor 32, depending on the selection made for the duration of the open interval O relative to the closed interval S (FIG. 11).

Taking as a starting point the first exemplary embodiment of the refrigerant compressor group according to the invention, with the first piston compressor 30 and the second piston compressor 32, and on the assumption that, with the first piston compressor 30 with speed selection D, at most approximately 60% of the maximum mass flow throughput in the refrigerant compressor group 12 is achievable and, with the second piston compressor 32 at constant speed, for example at the drive frequency of 50 Hz corresponding to mains frequency, at most approximately 40% of the maximum mass flow throughput in the refrigerant compressor group 12 is achievable, the following operating modes are possible:

in order to establish the smallest possible overall mass flow throughput in the refrigerant compressor group, the first piston compressor 30 is switched off and the second piston compressor 32 is operated at constant speed, for example at a drive frequency corresponding to mains frequency, with cylinder selection Z2', with the result that the overall mass flow throughput can be varied in relation to the maximum mass flow throughput in the refrigerant compressor group 12 from approximately 5% to approximately 20%, with the result that an almost continuous variation in the overall mass flow throughput within this range is possible with the second piston compressor 32 as the guide compressor;

if the first piston compressor 30 is operated with speed selection D, then with this and with the second piston compressor 32 switched off, an overall mass flow throughput of approximately 18% to approximately 60% of the maximum mass flow throughput in the refrigerant compressor group 12 can be variably established, in which case the first piston compressor 30 operates as the guide compressor;

if the first piston compressor 30 and the second piston compressor 32 are operated together, then with these, depending on the speed selection D of the first piston compressor 30 and the cylinder selection Z or Z' of the second piston compressor 32, an overall mass flow throughput of approximately 38% to approximately 100% of the maximum mass flow throughput in the refrigerant compressor group 12 can be variably established, and in these cases the first piston compressor 30 operates as the guide compressor.

In the simplest case, the operating condition controller 130 operates the refrigerant compressor group 12 at an overall mass flow throughput of approximately 5% to 15% or more, at most approximately 20%, with the second piston compressor 32 at constant speed and cylinder selection Z2' as the guide compressor and with the first refrigerant compressor 30 switched off.

After that, the second refrigerant compressor 32 is switched off and the first refrigerant compressor 30 is switched on as the guide compressor, with an overall mass flow throughput starting at approximately 15% or at the latest at approximately 20%, up to an overall mass flow throughput of between 38% and 60% of the maximum mass flow throughput in the refrigerant compressor group 12.

Taking as a starting point a range of between 38% and 60% of the overall mass flow throughput, both piston compressors 30 and 32 are operated with the combination of speed selection D in the first piston compressor 30, as the guide compressor, and cylinder selection Z, Z' in the second piston compressor 32 at constant speed, first with the cylinder selection Z2 until approximately 60% of the maximum mass flow throughput in the refrigerant compressor group 12 is achieved, and then with a cylinder selection Z1, that is to say use of all the cylinder banks 42a, b of the second piston compressor 32 at constant speed until the overall mass flow throughput of 100% of the maximum mass flow throughput in the refrigerant compressor group 12 is achieved, in which case the first and the second piston compressors 30, 32 each generate their maximum mass flow throughput of respectively 50% of the maximum mass flow throughput in the refrigerant compressor group 12.

In a further embodiment, the operating condition controller 130 is able to identify or detect the quality grade or COP value of the refrigerant compressor group 12, depending on the respective cylinder selection Z or Z' in the second piston compressor 32 and the speed selection D in the first piston compressor 30 with the respective overall mass flow throughput, wherein the quality grade or COP value is dependent in particular on the refrigerant used, the speed of the electric motors 60 of the piston compressors 30 and 32, the number of active cylinder banks 42 and the ratio of high pressure PH to suction pressure PS.

Where there is precise calculation, the quality grade or COP value is determined for example in conformance with the following publication:

Compressors and condensing units for refrigeration—Performance testing and test methods—Part 1, Refrigerant compressors in particular Section 4.1.5.2 and for example equation 7 of European Standard CEN/TC 113, Date 2014-04, prEN 13 771-1:2014.

As an alternative or in addition, the operating condition controller 130 is also able to detect the electrical power consumption of the compressor group 12 depending on the respective cylinder selection Z or Z' in the piston compressor 32 and the speed selection D in the piston compressor 30 in the respective one.

With the aid of the operating condition controller 130, in the refrigerant compressor group 12 there is thus the possibility, in the event that a plurality of options for cylinder selection Z or Z' of the piston compressor 32 and speed selection D of the piston compressor 30 are available for achieving an overall mass flow throughput requested by the performance request signal LA, of optimising operation of the refrigerant compressor group 12 in respect of the greatest possible efficiency in the respective overall mass flow throughputs—which is expressed as the highest possible quality grade or COP value or the lowest possible electrical power consumption by the electric motor 60—by suitable cylinder selection Z or Z' and speed selection D in order to carry out operation in the requested overall mass flow throughput.

This taking into account or determination of the quality grade or COP value or electrical power consumption for the respective overall mass flow throughput may be performed in advance, or may be performed while operation of the refrigerant compressor group 12 is running, by retrieving data that was determined in advance in test runs and stored in the operating condition controller 130.

For this purpose, the respective possible operating modes B, comprising cylinder selection Z or Z' and speed selection D, are determined for the respective overall mass flow throughput, and associated with these are in each case a quality grade or COP value or electrical power consumption, such that the operating condition controller 130 for the overall mass flow throughput requested by the performance request signal LA can select the cylinder selection Z or Z' and speed selection D with the respectively most favourable quality grade or COP value and can operate the refrigerant compressor group 12 accordingly.

A further possibility provides for the refrigerant compressor group 12 to be operated in the respective overall mass flow throughput and for the power consumed by the electric motors 60 of the piston compressors 30 and 32 with each overall mass flow throughput to be detected such that the operating condition controller 130 can then assess and store the cylinder selection Z or Z' and speed selection D with the lowest electrical power consumption and the greatest efficiency and in future use only this cylinder selection Z or Z' and speed selection D as the one with the greatest efficiency for this overall mass flow throughput.

Figure 12:
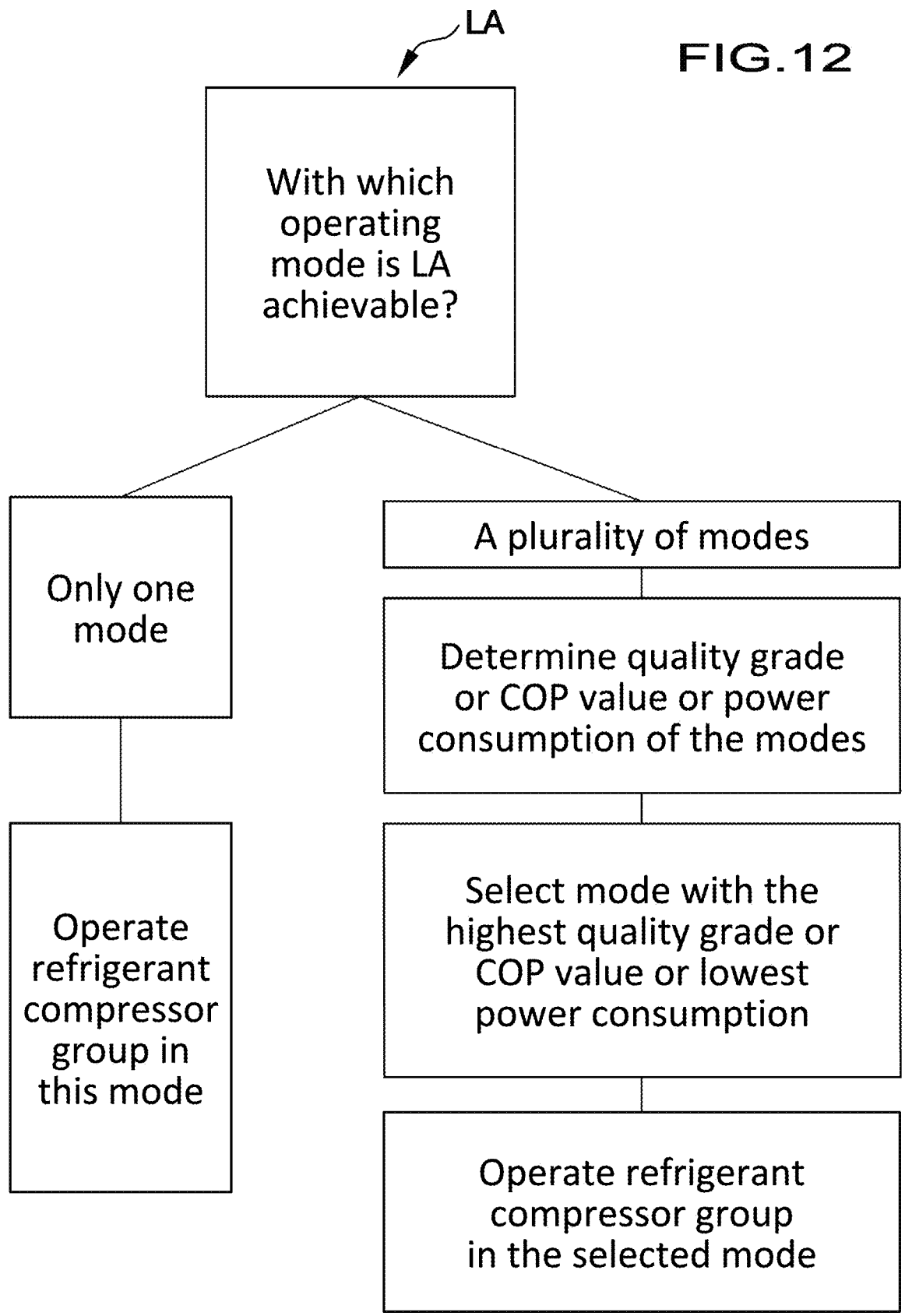
FIG. 12 shows a flow chart for the purpose of illustrating the procedure according to the invention.

The procedure for selection of the possible operating mode B by the operating condition controller 130 is illustrated in FIG. 12.

First, when a performance request LA is received by the operating condition controller 130, a check is made as to whether only one operating mode—that is to say only one cylinder selection Z or Z' and speed selection D—or a plurality of operating modes—that is to say a plurality of cylinder selections Z or Z' and speed selections D—is/are available for achieving this performance request LA.

Typically, with an overall mass flow throughput that is close to the maximum performance of the refrigerant compressor group 12, only one cylinder selection Z and speed selection D are available, namely a cylinder selection at which all the cylinder banks 42 of the piston compressor 32 are activated to their full extent and adaptation to the overall mass flow throughput is performed by regulating the speed of the drive motor 60 of the piston compressor 30.

In the case of overall mass flow throughputs that are in the middle or low range, typically it is possible to select from a plurality of operating modes—that is to say cylinder selections Z or Z' and speed selections D—depending on how many cylinder banks 42 are available and whether the refrigerant compressor group 12 can be operated with unmodulated or time-modulated cylinder selections Z or Z'.

In respect of these cylinder selections Z or Z' of the piston compressor 32, the speed selection D of the electric motor 60 of the piston compressor 30 that is required for the purpose of achieving the requested overall mass flow throughput is then determined for the respective operating mode, and on this basis the quality grade or COP value or electrical power consumption is then taken into account or determined for the respective operating mode in the manner described above.

Using the quality grade or COP value or electrical power consumption that is associated with the respective operating mode—comprising a cylinder selection Z or Z' and speed selection D—it is possible to select the operating mode with the best quality grade or COP value or the lowest electrical power consumption, and this operating mode is then used by the operating condition controller 130 for operation of the refrigerant compressor group 12 in order to achieve the overall mass flow throughput requested by the load request signal LA.

The general procedure explained above is explained below by way of a simple example of the first exemplary embodiment of the refrigerant compressor group 12 described initially, according to FIG. 1, with reference to a simplified procedure for determining the quality grade or COP value or electrical power consumption.

Figure 13:
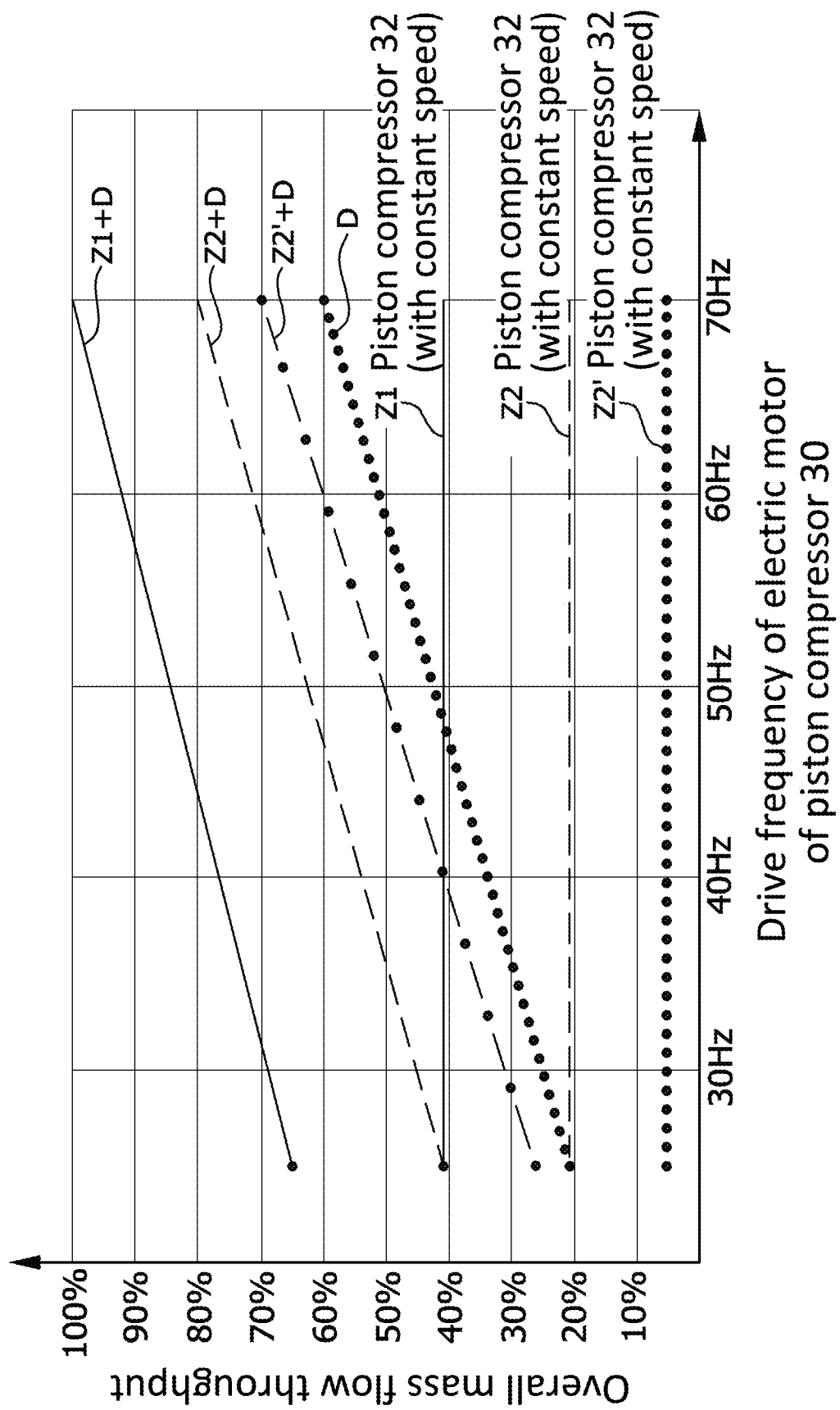
FIG. 13 shows an illustration of the overall mass flow throughput in the refrigerant compressor group according to FIG. 1, with different cylinder selection of the second piston compressor and speed selection of the first piston compressor.

In the case of the refrigerant compressor group 12 which, according to the first exemplary embodiment, has two cylinder banks 42a and 42b for each piston compressor 30, 32, in the overall mass flow throughput with restriction of the second piston compressor 32 to operation at constant speed and with unmodulated cylinder selection Z, the only possibility is to operate this with a first cylinder selection Z1, in which both cylinder banks 42a and 42b are active, or to operate it with a second cylinder selection Z2, in which only one of the cylinder banks 42a, 42b is active and the other is inactive, wherein the contribution of cylinder selections Z1, Z2 of this kind to the overall mass flow throughput is illustrated in FIG. 13.

With each unmodulated cylinder selection Z1 and Z2 of the second piston compressor 32, there is the possibility, by speed selection D, of varying the speed of the electric motor 60 of the first piston compressor 30 with the aid of the frequency converter 62, for example by varying the drive frequency of the frequency converter 62 between 25 Hz and 70 Hz, wherein the contribution of the piston compressor 30 to the overall mass flow throughput with the respective speed selection D is likewise illustrated in FIG. 13.

Because in the case of an overall mass flow throughput above 80% all the cylinder banks 42a, 42b must be active, these are only achievable by cylinder selection Z1, and an overall mass flow throughput below 80% is also achievable by deactivating one of the cylinder banks 42a, 42b, and thus by cylinder selection Z2, with the result that in the case of overall mass flow throughputs between 65% and 80% optimisation is possible by taking into account the quality grade or COP value or electrical power consumption, since with overall mass flow throughputs between 65% and 80% the piston compressor 32 of the refrigerant compressor group 12 can either be operated with the first cylinder selection Z1 or the second cylinder selection Z2.

For this reason, a selection between the first cylinder selection that is not time-modulated Z1 and the second cylinder selection that is not time-modulated Z2 is possible by determining the quality grade or COP value or electrical power consumption, wherein the piston compressor 30 can be operated with the suitable speed selection D.

In order for example to be able to take into account the quality grade or COP value or electrical power consumption in a simplified manner, the possible performance conditions between 65% and 80% are divided into two groups, for example in the simplest case depending on the high pressure PH detected by the high-pressure sensor 136.

If, with a certain refrigerant, the high pressure PH is for example above a high-pressure threshold value PHG, then the cylinder selection that is not time-modulated Z2 is selected; if the high pressure PH is below the threshold value PHG, then the cylinder selection that is not time-modulated Z1 is selected.

It is possible to take the quality grade or COP value or electrical power consumption into account in a similar way with an overall mass flow throughput between approximately 40% and approximately 60% of the maximum mass flow throughput, either by operating the first piston compressor 30 with speed selection D and a speed of the electric motor 60 that is predeterminable by a drive frequency of between approximately 50 Hz and approximately 70 Hz and with the second piston compressor 32 switched off, or by operating the first refrigerant compressor 30 with speed selection D and a drive frequency of between approximately 25 Hz and approximately 45 Hz, in combination with the second piston compressor 32 with a constant speed and the unmodulated cylinder selection Z2.

With the unmodulated cylinder selections Z1 and Z2, in each case the corresponding cylinder bank is activated or deactivated constantly over time, throughout the whole of the time during which an overall mass flow throughput is achieved.

However, because time-modulated cylinder selections Z' may likewise be achieved in which the respective cylinder bank 42 may be activated or deactivated for proportions of the time during succeeding switching intervals SI, the first exemplary embodiment of the refrigerant compressor group according to the invention also provides the possibility, for example by selecting only one of the cylinder banks 42 and by clocked activation and deactivation of this one cylinder bank 42 within the switching intervals SI, and by uninterruptedly deactivating the other cylinder bank 42, of selecting for example a cylinder selection Z2' of the second piston compressor 32, which is operated at constant speed, in which even lower performance conditions are possible, in which case for example with an overall mass flow throughput of between 5% and 25% it is possible to optimise operation of the refrigerant compressor group 12, likewise in respect of the quality grade or COP value or electronic power consumption, by making a selection between the cylinder selection Z2 and the time-modulated cylinder selection Z2' with variations in the time modulation (FIG. 13).

Moreover, there is a possibility of optimisation between the overall mass flow throughput of from 25% to 80% by varying the time modulation of the cylinder selection Z2' of the second piston compressor 32, which is operated at constant speed, if this is combined with the first piston compressor, operated with speed selection D.

In simple terms, with a high pressure PH above the high-pressure threshold value PHG it is likewise possible to select the cylinder selection Z2', whereas with a high pressure PH below the threshold value PHG the cylinder selection Z2 is selected.

However, depending on the refrigerant used, these conditions may also be reversed.

Figure 14:
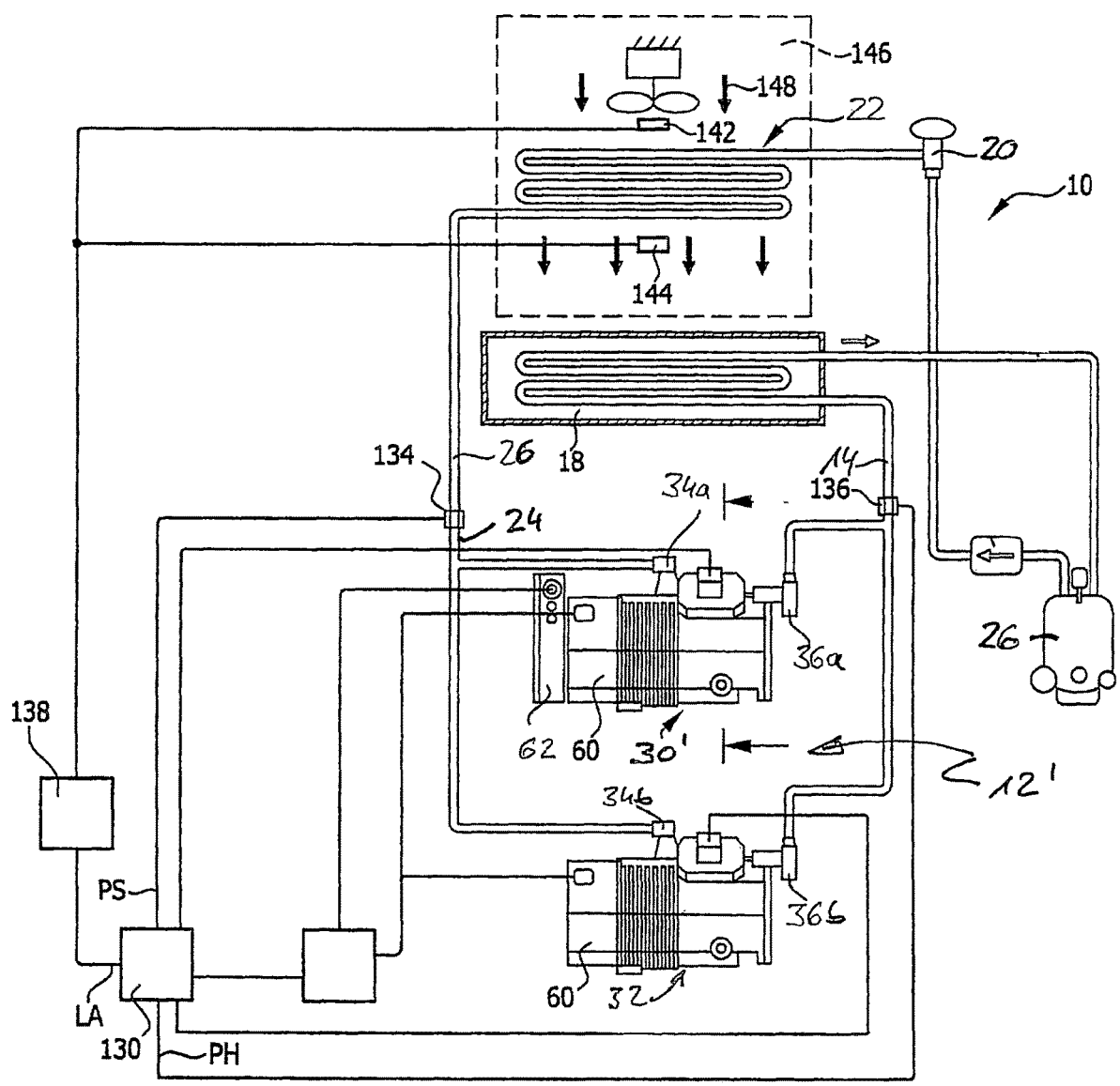
FIG. 14 shows an illustration of a second exemplary embodiment of a refrigerant compressor group.

In the case of a second exemplary embodiment of a refrigeration system according to the invention, illustrated in FIG. 14, the elements that are identical to those of the first exemplary embodiment are provided with the same reference numerals, so for a description of these reference may be made to the statements relating to the first exemplary embodiment.

Unlike the first exemplary embodiment, in the case of the second exemplary embodiment the compressor group 12' is formed by the piston compressor 30' and the piston compressor 32, which is identical to that of the first piston compressor.

Unlike the first exemplary embodiment, the piston compressor 30' is not only provided with the frequency converter 62 but, as illustrated in FIG. 4, but both cylinder banks 42a and 42b are in each case provided with a mechanical performance control unit that is designated 70 as a whole, such that the respective cylinder bank 42a and 42b is configured to be switched off, as explained in conjunction with the piston compressor 32 of the first exemplary embodiment.

Thus, in the case of the compressor group 12' of the second exemplary embodiment, it is possible to operate each of the piston compressors 30' and 32 with a cylinder selection Z1 or Z2 or Z2' and additionally also to operate the piston compressor 30' with the aid of the frequency converter 32 with speed selection D, which has a multiplicative effect on the cylinder selection Z1, Z2 or Z2' of the piston compressor 30.

Thus, in the second exemplary embodiment, it is possible to adjust the overall mass flow throughput in that, on the one hand, with the second piston compressor 32 operating at fixed speed, the mass flow throughput is adjustable by the cylinder selection Z1, Z2 or Z2', in the same way as described in conjunction with the first exemplary embodiment, but moreover in the second exemplary embodiment it is not only the speed selection for the first piston compressor 30' that is decisive for the overall mass flow throughput but also the cylinder selection Z1, Z2 or Z2'. In this way, in the case of the second exemplary embodiment of the refrigerant compressor group according to the invention there are even more possibilities for optimising the overall mass flow throughput required for a for the performance request signal LA in respect of the refrigerant output as regards the quality grade, COP value or electrical power consumption.

Figure 15:
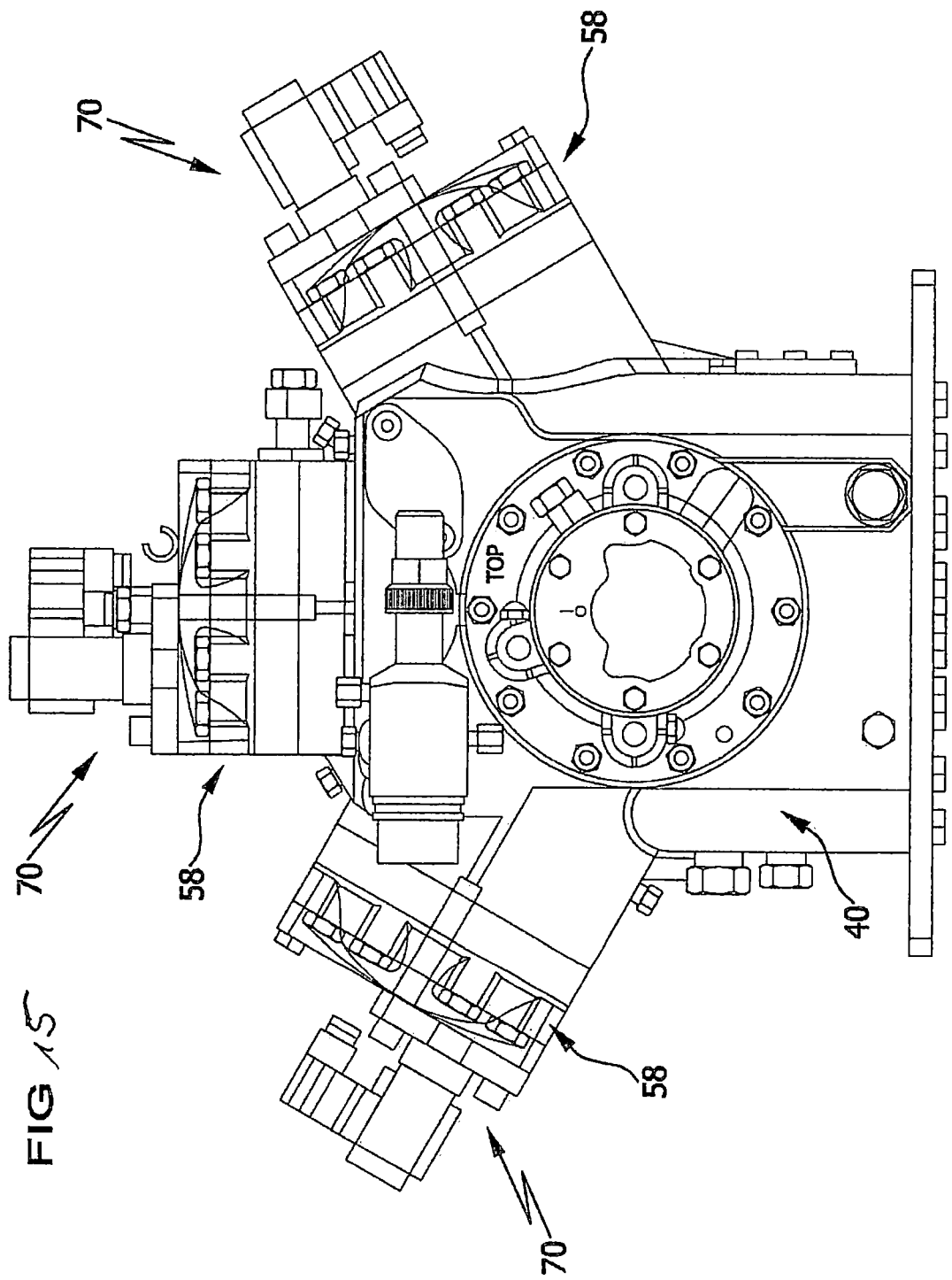
FIG. 15 shows a view of a piston compressor according to a third exemplary embodiment of a refrigerant compressor group according to the invention.
Figure 16:
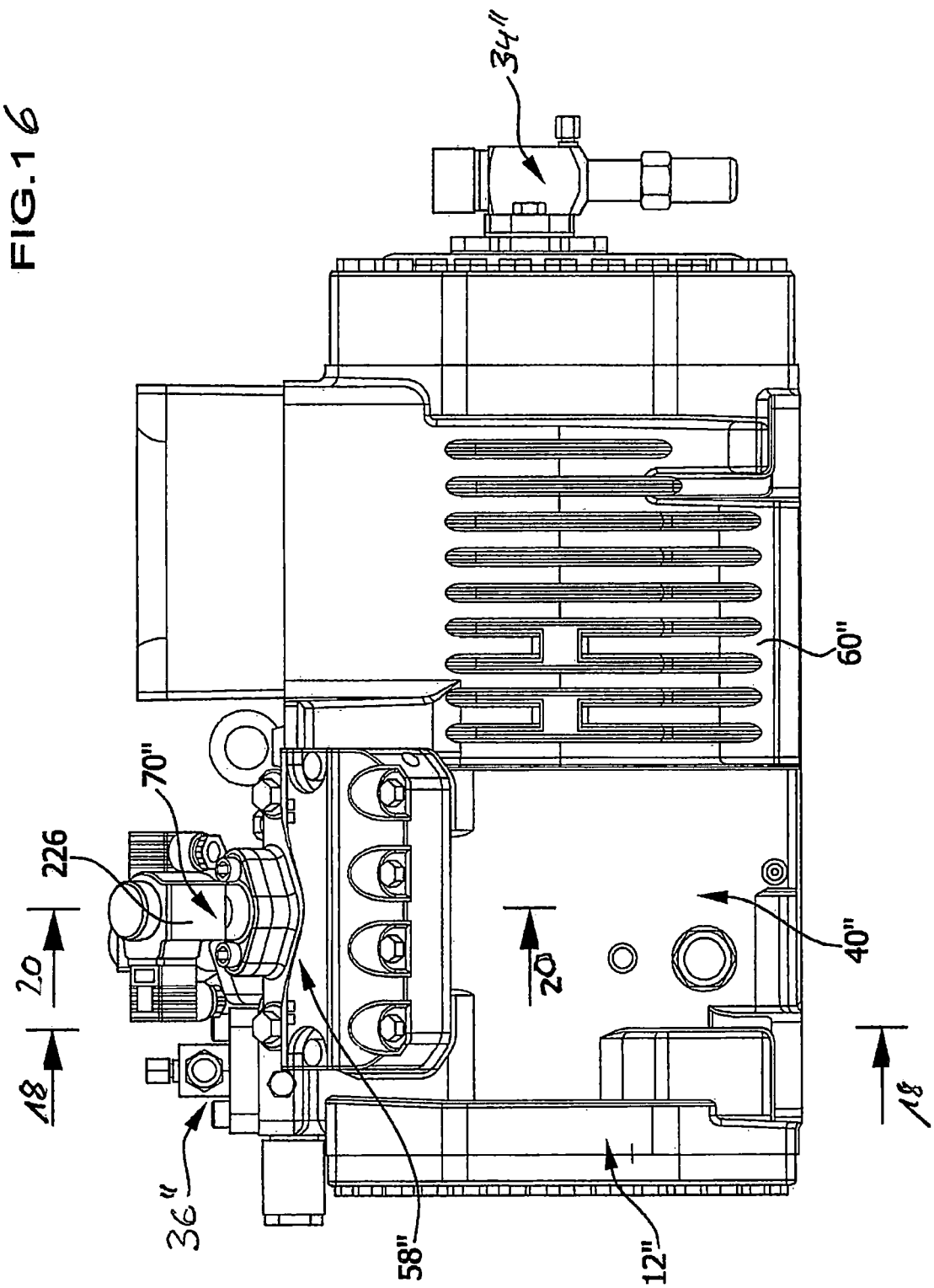
FIG. 16 shows a side view of a piston compressor of a fourth exemplary embodiment of a refrigerant compressor group according to the invention.
Figure 17:
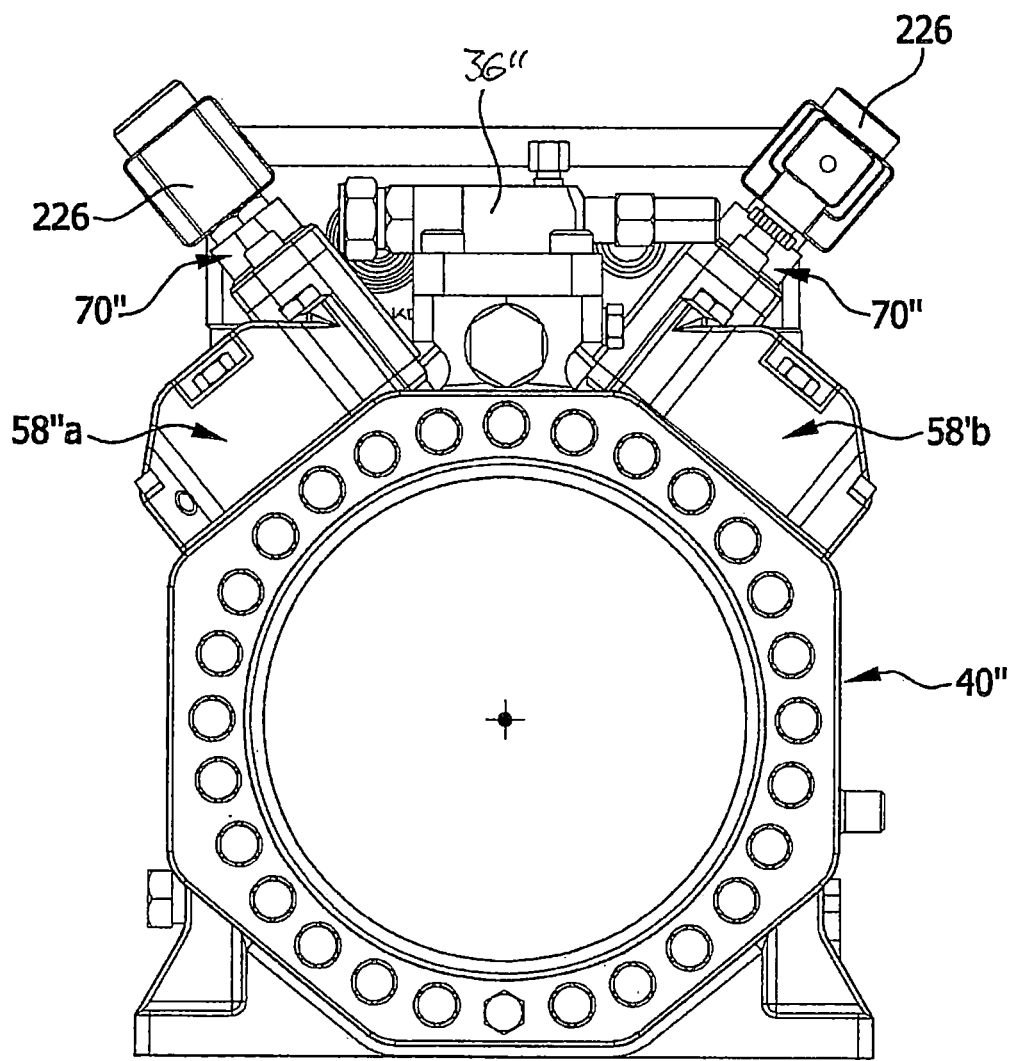
FIG. 17 shows a front view of the fourth exemplary embodiment of the refrigerant compressor group according to the invention.
Figure 18:
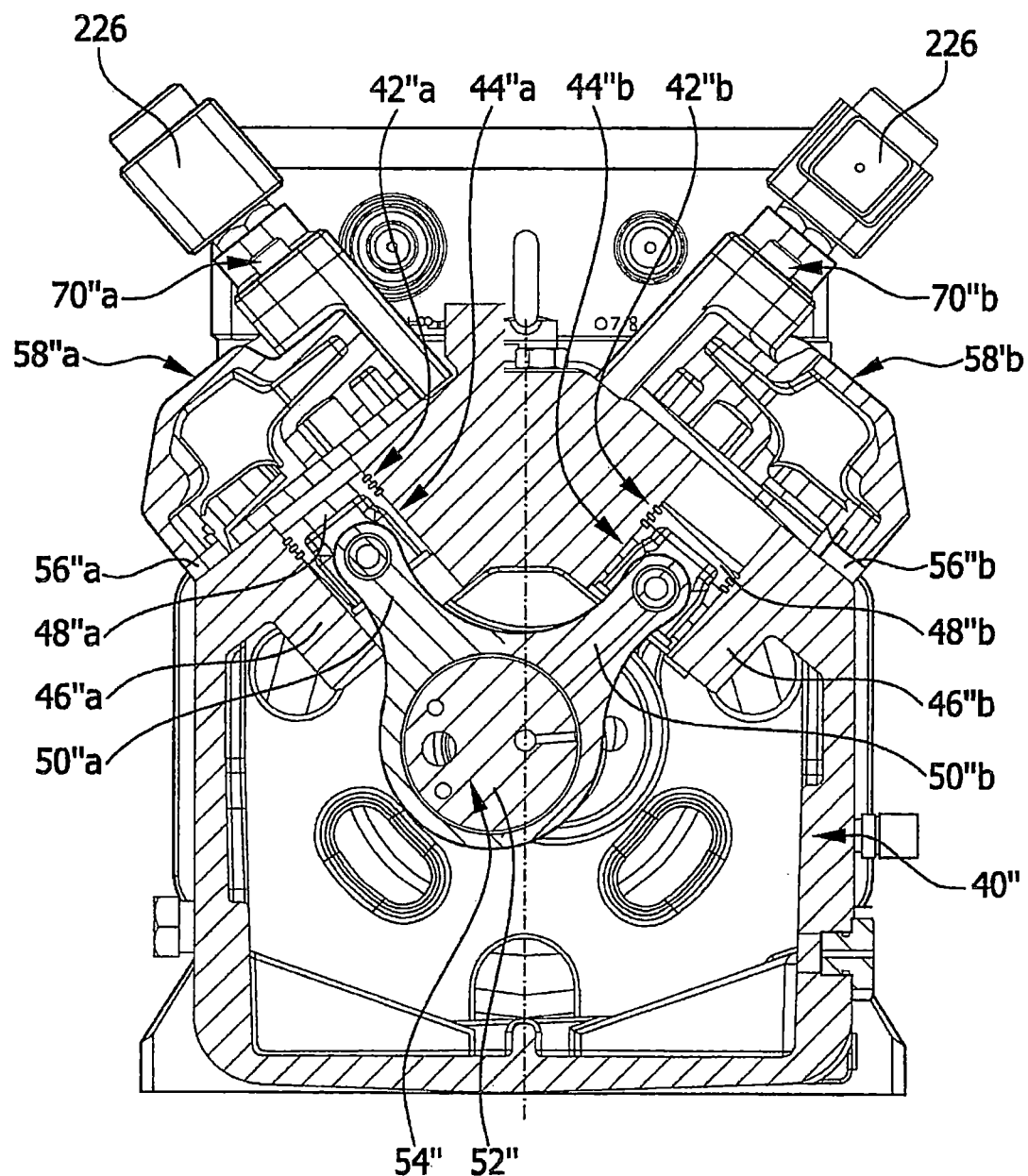
FIG. 18 shows a section, offset to one side, along the line 18-18 in FIG. 16.
Figure 19:
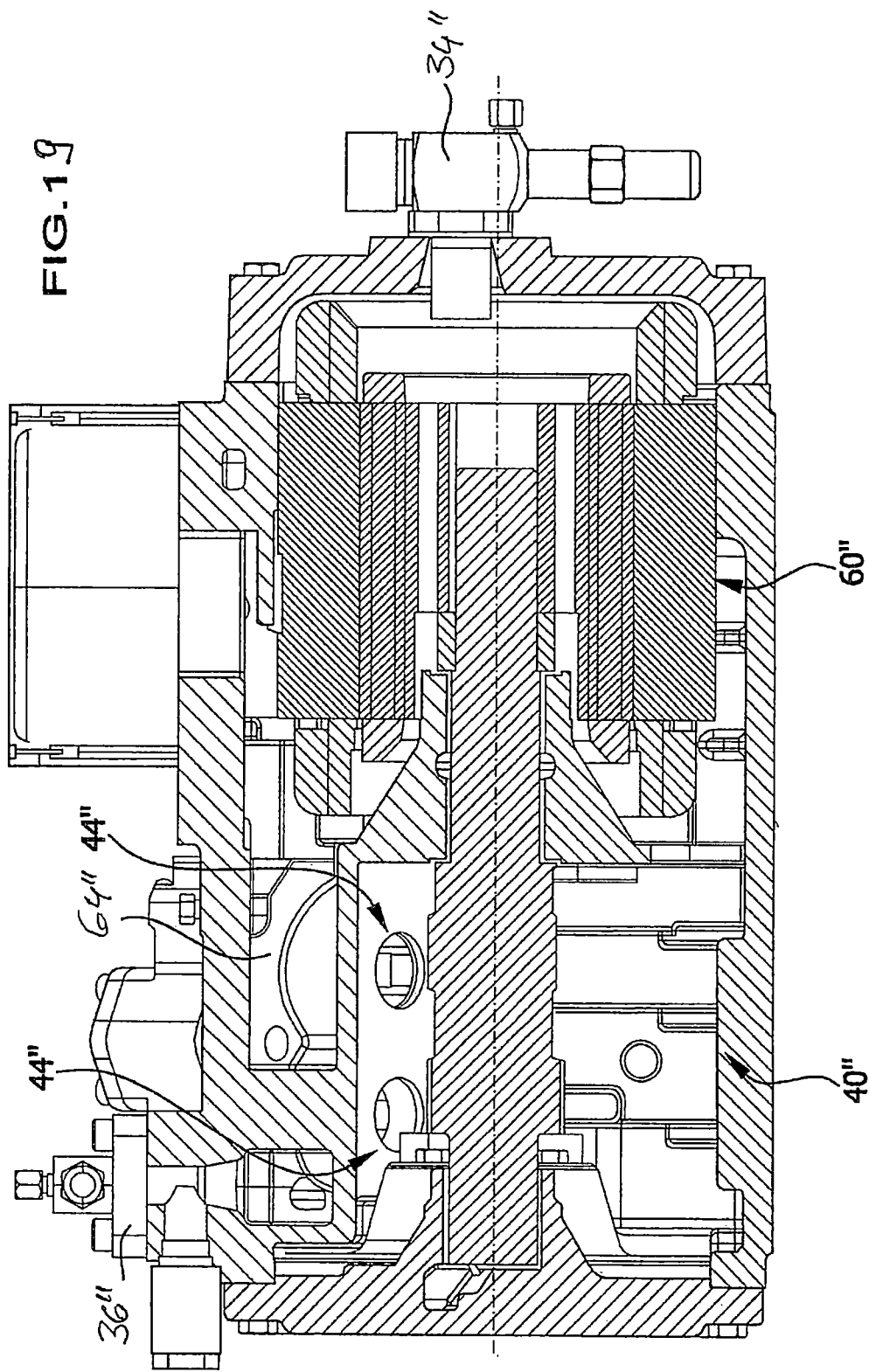
FIG. 19 shows a longitudinal section through the piston compressor of the third exemplary embodiment of the refrigerant compressor group according to the invention.

If, according to a third exemplary embodiment of a refrigerant compressor group 12, for example both piston compressors 30 and 32 or only one of them is provided with three cylinder banks 42a, 42b and 42c (FIG. 15), for example having in each case two cylinders per cylinder bank 42, wherein each of the cylinder banks 42a, 42b and 42c is activatable or deactivatable individually with the aid of an associated mechanical performance control unit 70, then three cylinder selections Z1, Z2, Z3 are possible, namely the first cylinder selection Z1 with all the cylinder banks 42a, 42b and 42c in the activated condition, a second cylinder selection Z2 with two of the cylinder banks 42 in the activated condition, and a third cylinder selection Z3 with only one of the cylinder banks 42 in the activated condition.

As regards the detailed construction, the second exemplary embodiment corresponds to the first exemplary embodiment.

Thus, for the respective overall mass flow throughput that is requested by the performance request LA, the most diverse possibilities open up for achieving this.

If for example only the second piston compressor 32 is provided with cylinder banks 42a, 42b and 42c that are configured to be switched on, then even with an unmodulated cylinder selection Z this opens up the possibility of varying the mass flow throughput in this piston compressor 32 between 33%, 66% and 100% of the possible mass flow throughput therein and accordingly supplementing the mass flow throughput in the first piston compressor 30.

Here, in the simplest case, the first piston compressor 30 may have no cylinder banks 42 that are configured to be switched off and may thus generate a variable refrigerant output solely by speed selection, this being variable for example between approximately 50 and 100% of the refrigerant output.

However, if the first piston compressor 30 is also provided with three cylinder banks 42a, 42b and 42c that are respectively configured to be switched on and off, then purely by the cylinder selection Z its mass flow throughput is adjustable between at most 33%, at most 66% and at most 100%, and in addition, in each case by reducing the speed on the basis of the speed selection D with each cylinder selection, the mass flow throughput thereof is also reducible by 70%—that is to say that as a minimum a mass flow throughput is variable to approximately 11% with one cylinder bank, approximately 22% with two cylinder banks and a minimum of 33% with three cylinder banks switched on.

Similarly, additional variations can be also achieved by a time-modulated cylinder selection Z'.

A fourth exemplary embodiment of a refrigerant compressor group, which is particularly suitable where $CO_2$ is the refrigerant, comprises piston compressors 30" and 32", each with a suction port 34" and a pressurised port 14".

As illustrated in FIGS. 16 to 21, the respective piston compressor comprises a compressor housing 40" in which there are provided for example two cylinder banks 42"a and 42"b that are arranged in a V shape in relation to one another and work in parallel and of which each comprises at least one, in particular two or more cylinder units 44".

Each of these cylinder units 44" is formed from a cylinder housing 46", in which a respective piston 48" is movable in reciprocating manner in that the piston 48" is drivable by a respective piston rod 50", which is in turn seated on an eccentric 52" of an eccentric shaft 54" that is driven for example by an electric motor 60", which may be configured as a synchronous or asynchronous motor.

The cylinder housing 46" of each of the cylinder units 44" is closed off by a valve plate 56" on which there is arranged a cylinder head 58".

Preferably, in this context, the valve plate 56" covers not only one cylinder housing 46" of a cylinder bank 42" but all the cylinder housings 46" of the respective cylinder bank 42", and in the same way the cylinder head 58" likewise engages over all the cylinder housings 46" of the respective cylinder bank 42".

Further, the compressor housing 40" also comprises an inlet channel 62" that is in communication with the low-pressure connector 36" and is for example integrated into the compressor housing 40".

Figure 20:
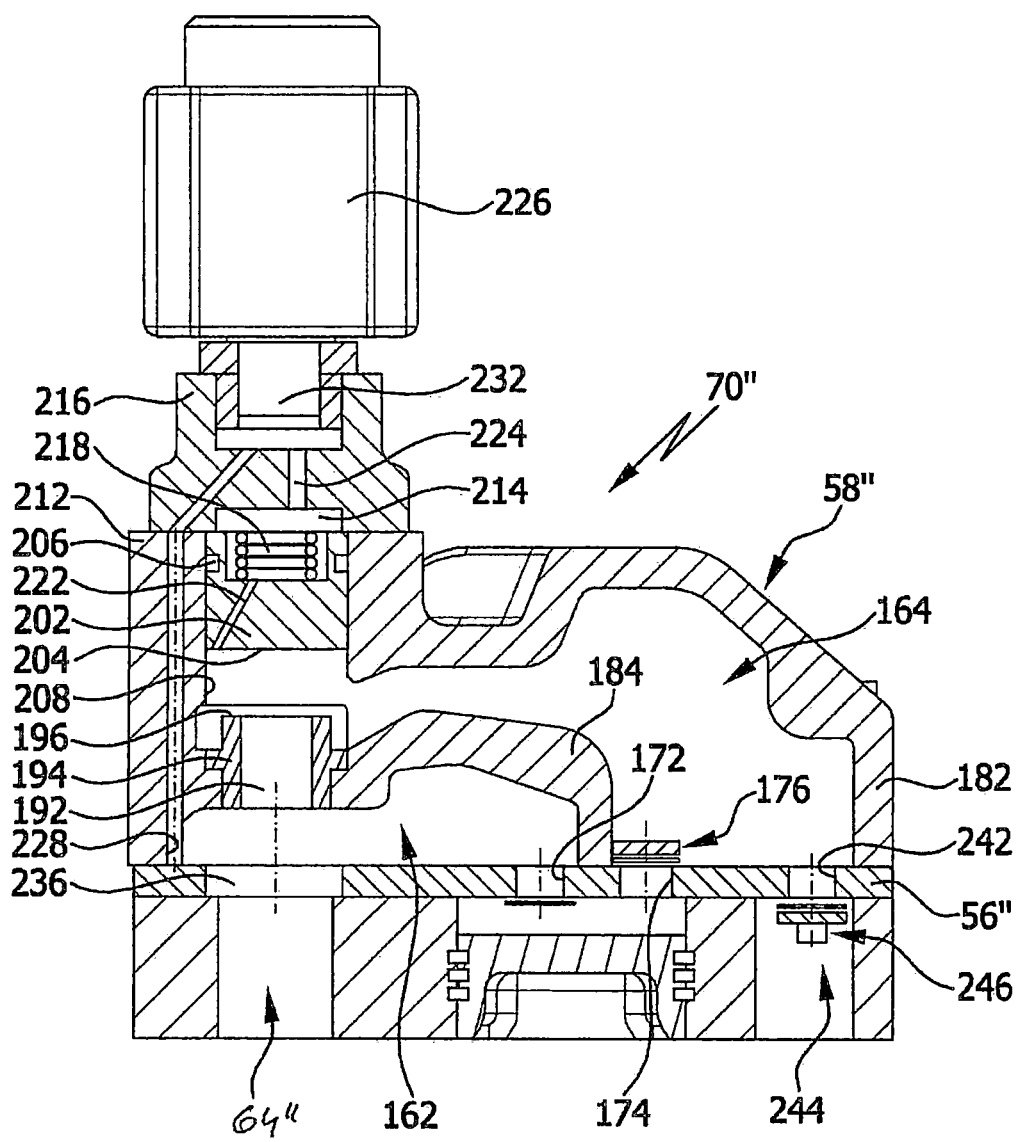
FIG. 20 shows a section along the line 20-20 in FIG. 16, with a connection channel between the inlet chamber and the outlet chamber open.
Figure 21:
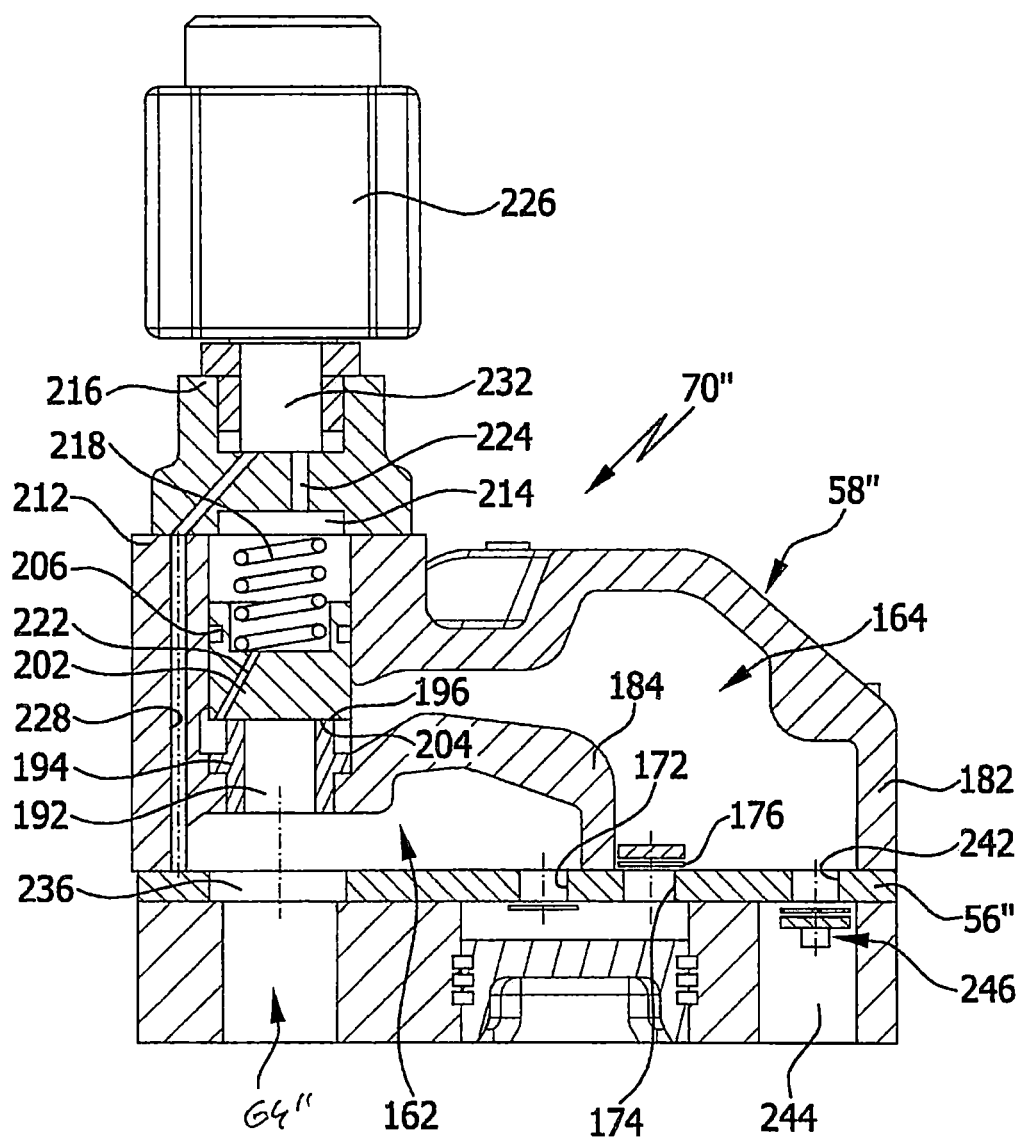
FIG. 21 shows a section similar to FIG. 20, with the connection channel between the outlet chamber and the inlet chamber closed.

In each of the cylinder heads 42"a and 42"b there is arranged, as illustrated in FIGS. 20 and 21, respectively an inlet chamber 162 and an outlet chamber 164, which are associated with the two cylinder units 44" of the respective cylinder bank 42".

In particular, the inlet chamber 162 lies above inlet openings 172 of the cylinder units 44" of the cylinder bank 42".

Further, the outlet chamber 164 lies above outlet openings 174 of the cylinder units 44", wherein the outlet openings 174 are arranged in the valve plate 56" and provided with outlet valves 176 seated on the valve plate 56", wherein these are in particular directly adjoined by the outlet chamber 164.

As illustrated in FIGS. 20 and 21, each cylinder head 42" comprises an outer body 182 which engages over the respective valve plate 56" and encloses the inlet chamber 162 and the outlet chamber 164, which for their part are separated from one another by a separating body 184 that runs within the outer body 182, wherein the separating body 184 rises from the respective valve body 56" and extends and engages over the inlet chamber 162.

In this way, in the region of the valve plate 56" the outlet chamber 164 lies laterally next to the inlet chamber 162, but, at least in certain regions, extends above the inlet chamber 162 between the outer body 182 and the separating body 184.

For the purpose of operating condition control of the overall mass flow throughput in the refrigerant compressor group, there is associated with each cylinder head 58" the mechanical performance control unit 70", which is actively controlled by the operating condition controller 130 and by means of which a connection channel 192 between the outlet chamber 164 and the inlet chamber 162 can be closed off or opened, wherein the cylinder units 44" that are associated with the cylinder head 58" compress refrigerant at full performance when the connection channel 192 is closed (FIG. 21), and, when the connection channel 192 is open, do not compress any refrigerant because the refrigerant flows from the outlet chamber 164 back into the inlet chamber 162.

In this arrangement, the connection channel 192 runs through an insert part 194 that is inserted into the separating body 184 and forms a gasket seat 196 which faces the outlet chamber 164 and adjoins a part of the outlet chamber 164 that surrounds and adjoins the gasket seat 196.

Further, the gasket seat 196 faces a shut-off piston 202 which is configured to be set, for example by means of a metal gasket region 204, on the gasket seat 196 in order to shut off the connection channel 192 with a tight seal, and which is configured to be raised far enough away from the gasket seat 196 for the gasket region 204 to be at a spacing from the gasket seat 196 and thus for refrigerant to be able to flow over from the outlet chamber 162 into the inlet chamber 164.

Preferably in this case, the shut-off piston 202 is guided, coaxially in relation to the insert part 194 having the gasket seat 196, and sealed off with the aid of a piston ring 206, in a guide bore 208 formed by a guide sleeve body 212 of the cylinder head 58" that is integrally formed on the outer body 182.

Preferably, the shut-off piston 202 itself, or at least the gasket region 204, is made from a metal, for example a non-ferrous metal, that has a lower hardness than the metal of the gasket seat 196, which is made for example from steel, in particular tempered steel.

In order to enable a rapid movement of the shut-off piston 202, in particular a stroke length of the shut-off piston 202 between a shut-off position and an open position lies in the range between a quarter and half of an average diameter of the connection channel 192.

Here, the shut-off piston 202 is adjacent to a pressure chamber 214, which is arranged on a side of the shut-off piston 202 remote from the gasket region 204 and is closed off on an opposite side to the shut-off piston 202 by a terminating body 216.

In particular, the volume of the pressure chamber 216 is so small that, in the open position of the shut-off piston, it is less than a third, preferably less than a quarter, more preferably less than a fifth, advantageously less than a sixth and more advantageously less than an eighth of the maximum volume of the pressure chamber 216 in the shut-off position of the shut-off piston 202.

Further, arranged in the pressure chamber 216 there is also a pressure spring 218, which is supported at one end against the terminating body 216 and at the other urges the shut-off piston 202 in the direction of its shut-off position, seated on the gasket seat 196.

Depending on the pressurisation of the pressure chamber 216, the shut-off piston 202 is movable into its open position, illustrated in FIG. 20, or into its shut-off position, illustrated in FIG. 21.

For this purpose, a throttle channel 222 passes through the shut-off piston 202, extending from the pressure chamber 214, through the shut-off piston 202, as far as an opening orifice that is arranged radially outside the gasket region on a side facing the gasket seat 196, but because the opening orifice lies radially outside the gasket region 204 the throttle channel 222 allows refrigerant which is pressurised in the outlet chamber 164 and flows around the gasket seat 196 to enter when the shut-off piston 202 is in the shut-off position, and supplies this refrigerant to the pressure chamber 214 in throttled manner.

Moreover, leading into the pressure chamber 214, for example through the terminating body 216, is a relief channel 224, which is configured to be connected to a pressure relief channel 228 by a solenoid valve designated 226 as a whole, wherein the pressure relief channel 228 is in communication with the inlet chamber 162.

For example, the solenoid valve 226 is configured such that it has a valve body 232 by means of which the connection between the pressure relief channel 228 and the relief channel 224 can be made or interrupted.

When the connection is made between the relief channel 224 and the pressure relief channel 228, suction pressure dominates in the pressure chamber 214, while the shut-off piston 202 is urged on its side facing the outlet chamber 164 by the pressure in the outlet chamber 164, and is thus moved into its open position.

However, when the connection between the pressure relief channel 228 and the relief channel 224 is interrupted by the valve body 232, the pressure spring 218 presses the shut-off piston 202 onto the gasket seat 196, and in addition high pressure flows through the throttle channel 222 and into the pressure chamber 214, with the result that high pressure builds up in the pressure chamber 214 and, in addition to the action of the pressure spring 218, presses the shut-off piston 202 onto the gasket seat 196 by means of the gasket element 204.

In particular, the shut-off piston 202 is configured such that it extends radially beyond the gasket seat 196, with the result that, even when the shut-off piston 202 is in the shut-off position, the piston face which is radially outside the gasket seat 196 and urged by high pressure causes the shut-off piston 202 to move, in opposition to the force of the pressure spring 218, into the open position illustrated in FIG. 20 provided that the valve body 232 of the solenoid valve 226 makes the connection between the relief channel 224 and the pressure relief channel 228, which causes a suction pressure to be established in the pressure chamber 214.

Refrigerant that is under suction pressure is supplied by way of a supply channel 64, which is formed in the compressor housing 40" and leads to an inlet opening leading to the valve plate 56", wherein refrigerant under suction pressure flows through the inlet opening to a passage opening 236 in the valve plate 56", through which it passes into the inlet chamber 162.

Moreover, as illustrated in FIGS. 20 and 21, the outlet chamber 164 leads to an outlet opening 242 in the valve plate 56", through which the refrigerant that is pressurised in the outlet chamber 164 passes into an outlet channel 244 provided in the compressor housing, and can flow to the high-pressure connector 16".

In particular, there is associated with the outlet opening 244 in the valve plate 56" a nonreturn valve 246 that is held against the valve plate 56' and ensures that, if the shut-off piston 202 is in the open position and hence there is an overflow of refrigerant out of the outlet chamber 164 and into the inlet chamber 162, the pressure in the outlet channel 244 does not fall but is maintained by the self-closing nonreturn valve 246.

The fourth exemplary embodiment of the refrigerant compressor group 12" is configured to operate in the same way as the first or second or third exemplary embodiments, so in respect of its operation with the cylinder selection Z and speed selection D reference may be made to the statements relating to the above exemplary embodiments in their entirety.

In all the exemplary embodiments of a compressor group according to the invention, in addition to the two piston compressors 30, 32 it is possible for further piston compressors also to be provided, which may additionally be used by the operating condition controller, preferably without cylinder selection Z and without speed selection D

The invention claimed is:

1. A refrigerant compressor group for a refrigeration system, comprising:
  at least two piston compressors that operate in parallel between a common low-pressure connector of which a low-pressure line leads to a heat exchanger on a low-pressure side and a common high-pressure connector, of which a high-pressure line leads to a heat exchanger on a high-pressure side are operable individually and each have an electric motor and cylinder units that are driven by the electric motor;

wherein, in the refrigerant compressor group, an overall mass flow throughput in the refrigerant compressor group that is variable within the range from a minimum mass flow throughput to a maximum mass flow throughput is adjustable in that, in the case of at least one of the piston compressors, its mass flow throughput is adjustable by speed selection with the aid of a frequency converter for the electric motor, and in that, in the case of at least one of the piston compressors, its mass flow throughput is adjustable by cylinder selection, and in that an operating condition controller for the refrigerant compressor group is provided which, on the basis of a performance request signal of the refrigeration system that is transmitted to the operating condition controller, controls the overall mass flow throughput by open or closed-loop control by predetermining the cylinder selection and the speed selection, and for the purpose of achieving the at least one overall mass flow throughput in the refrigerant compressor group, in at least one piston compressor the operating condition controller predetermines at least one cylinder selection that is constant over time and at least one time-modulated cylinder selection and the operating condition controller predetermines a speed selection.

2. The refrigerant compressor group according to claim 1, wherein, for the purpose of achieving the respective overall mass flow throughput, the operating condition controller operates a first one of the piston compressors with speed selection and a second one of the piston compressors with cylinder selection.

3. The refrigerant compressor group according to claim 2, wherein, for the purpose of achieving the respective overall mass flow throughput, the operating condition controller operates the second of the piston compressors with cylinder selection that is time-modulated.

4. The refrigerant compressor group according to claim 1, wherein, for the purpose of achieving the respective overall mass flow throughput, the operating condition controller operates a first one of the piston compressors with speed selection and cylinder selection, and a second one of the piston compressors with cylinder selection.

5. The refrigerant compressor group according to claim 4, wherein, for the purpose of achieving the respective overall mass flow throughput, the operating condition controller operates the first piston compressor and the second piston compressor with cylinder selection that is not time-modulated, and also operates one of the piston compressors with cylinder selection that is time-modulated.

6. The refrigerant compressor group according to claim 1, wherein operation of at least one of the piston compressors with speed selection comprises both operation at a speed of zero and also operation in a speed range that is suitable for the required mass flow throughput.

7. The refrigerant compressor group according to claim 1, wherein operation of at least one of the piston compressors by cylinder selection comprises operation with all the cylinder units.

8. The refrigerant compressor group according to claim 1, wherein, with an overall mass flow throughput at the minimum mass flow throughput, the operating condition controller operates only one of the piston compressors.

9. The refrigerant compressor group according to claim 8, wherein, with the lowest possible overall mass flow throughput, the operating condition controller operates only the refrigerant compressor that is operable with time-modulated cylinder selection.

10. The refrigerant compressor group according to claim 8, wherein, with an overall mass flow throughput at the lowest possible overall mass flow throughput, the operating condition controller operates only the refrigerant compressor that is operable with speed selection.

11. The refrigerant compressor group according to claim 8, wherein, with the lowest overall mass flow throughput, the operating condition controller operates only the piston compressor with speed selection and cylinder selection.

12. The refrigerant compressor group according to claim 1, wherein, with the respective overall mass flow throughput, the operating condition controller optimises the speed selection and the cylinder selection in respect of the highest quality grade or the highest COP value or the lowest electrical power consumption of the refrigerant compressor group.

13. The refrigerant compressor group according to claim 1, wherein, where there are a plurality of possible operating modes as a result of speed selection and cylinder selection, for the purpose of achieving the respective overall mass flow throughput, the operating condition controller determines the quality grade or COP value or electrical power consumption for the possible operating modes and selects the operating mode with the highest quality grade or COP value or the lowest electrical power consumption.

14. The refrigerant compressor group according to claim 1, wherein the operating condition controller has stored data that is required for determining the quality grade or COP value or electrical power consumption for the respective speed selection and/or cylinder selection.

15. The refrigerant compressor group according to claim 12, wherein the quality grade or COP value or electrical power consumption is determined by the operating condition controller by detecting the low pressure and/or high pressure of the refrigerant compressor group.

16. The refrigerant compressor group according to claim 12, wherein, for the purpose of determining the quality grade or COP value or electrical power consumption, the operating condition controller makes use of the refrigerant, the overall mass flow throughput, the electrical power consumption and/or the speed of the electric motors.

17. The refrigerant compressor group according to claim 1, wherein, for the purpose of optimising the quality grade or COP value or electrical power consumption of the possible operating modes comprising speed selection and cylinder selection, all the overall mass flow throughputs that are achievable by the refrigerant compressor group are associated with different overall mass flow throughput ranges, and wherein certain operating modes are associated with each overall mass flow throughput range.

18. The refrigerant compressor group according to claim 1, wherein each of the at least two piston compressors includes at least one cylinder bank, and wherein activation and deactivation of each cylinder bank is performed with the aid of a mechanical performance control unit that is controlled by the operating condition controller.

19. The refrigerant compressor group according to claim 18, wherein the mechanical performance control unit is associated with a cylinder head of the at least one cylinder bank.

20. The refrigerant compressor group according to claim 18, wherein the mechanical performance control unit controls an inlet stream into the inlet chamber of the cylinder head for the purpose of activating or deactivating the at least one cylinder bank.

21. The refrigerant compressor group according to claim 18, wherein the mechanical performance control unit connects the outlet chamber to the inlet chamber in the cylinder head for the purpose of activating or deactivating the at least one cylinder bank.

22. The refrigerant compressor group according to claim 1, wherein the operating condition controller is an operating condition controller that is separate from the frequency converter.

23. The refrigerant compressor group according to claim 1, wherein the operating condition controller is arranged in a housing that receives the frequency converter.

24. The refrigerant compressor group according to claim 18, wherein one of the at least two piston compressors includes at least two cylinder banks which work in a parallel operation.

25. The refrigerant compressor group according to claim 18, wherein each of the at least two piston compressors has at least two cylinder units per cylinder bank.

26. The refrigerant compressor group according to claim 1, wherein each of the at least two piston compressors has more than two cylinder banks.

27. A refrigeration system, comprising a refrigerant compressor group, a heat exchanger on the high-pressure side, an expansion member, and a heat exchanger on the low-pressure side, wherein the refrigerant compressor group takes a form according to claim 1.

28. The refrigeration system according to claim 27, wherein the refrigeration system has a system controller that generates the performance request signal for the operating condition controller.

29. The refrigeration system according to claim 28, wherein the operating condition controller is arranged in a housing of the system controller.

30. The refrigerant compressor group according to claim 2, wherein, for the purpose of achieving the respective overall mass flow throughput, the operating condition controller operates the second of the piston compressors with cylinder selection that is not time-modulated.

31. The refrigerant compressor group according to claim 1, wherein operation of at least one of the piston compressors by cylinder selection comprises operation with some of the cylinder units, or operation with some cylinder units switched off, or with the electric motor switched off.

32. A refrigerant compressor group for a refrigeration system, comprising:
at least two piston compressors that operate in parallel between a common low-pressure connector of which a low-pressure line leads to a heat exchanger on a low-pressure side and a common high-pressure connector, of which a high-pressure line leads to a heat exchanger on a high-pressure side are operable individually and each have an electric motor and cylinder units that are driven by the electric motor;
wherein, in the refrigerant compressor group, an overall mass flow throughput in the refrigerant compressor group that is variable within the range from a minimum mass flow throughput to a maximum mass flow throughput is adjustable in that, in the case of at least one of the piston compressors, its mass flow throughput is adjustable by speed selection with the aid of a frequency converter for the electric motor, and in that, in the case of at least one of the piston compressors, its mass flow throughput is adjustable by cylinder selection, and in that an operating condition controller for the refrigerant compressor group is provided which, on the basis of a performance request signal of the refrigeration system that is transmitted to the operating condition controller, controls the overall mass flow throughput by open or closed-loop control by predetermining the cylinder selection and the speed selection; and wherein each of the at least two piston compressors includes at least one cylinder bank, and wherein activation and deactivation of each cylinder bank is performed with the aid of a mechanical performance control unit that is controlled by the operating condition controller, wherein the mechanical performance control unit connects the outlet chamber to the inlet chamber in the cylinder head for the purpose of activating or deactivating the at least one cylinder bank.

* * * * *